United States Patent
Villemoes

(10) Patent No.: US 9,659,567 B2
(45) Date of Patent: May 23, 2017

(54) MODEL BASED PREDICTION IN A CRITICALLY SAMPLED FILTERBANK

(71) Applicant: DOLBY INTERNATIONAL AB, Amsterdam, Zuidoost (NL)

(72) Inventor: Lars Villemoes, Jarfalla (SE)

(73) Assignee: Dolby International AB, Amsterdam (NL)

( * ) Notice: Subject to any disclaimer, the term of this patent is extended or adjusted under 35 U.S.C. 154(b) by 29 days.

(21) Appl. No.: 14/655,037

(22) PCT Filed: Jan. 7, 2014

(86) PCT No.: PCT/EP2014/050139
§ 371 (c)(1),
(2) Date: Jun. 23, 2015

(87) PCT Pub. No.: WO2014/108393
PCT Pub. Date: Jul. 17, 2014

(65) Prior Publication Data
US 2016/0189720 A1 Jun. 30, 2016

Related U.S. Application Data

(60) Provisional application No. 61/875,528, filed on Sep. 9, 2013, provisional application No. 61/750,052, filed on Jan. 8, 2013.

(51) Int. Cl.
*G10L 21/00* (2013.01)
*G10L 19/02* (2013.01)
(Continued)

(52) U.S. Cl.
CPC ........ *G10L 19/0208* (2013.01); *G06F 17/505* (2013.01); *G06F 17/5045* (2013.01);
(Continued)

(58) Field of Classification Search
CPC ... G10L 19/012; G10L 21/02; G10L 21/0205; G10L 21/0364; G10L 25/78
(Continued)

(56) References Cited

U.S. PATENT DOCUMENTS 6,487,535 B1  11/2002  Smyth
7,194,407 B2   3/2007  Yin
(Continued)

FOREIGN PATENT DOCUMENTS

EP    2362376      8/2011
JP    H10-63298    3/1998
(Continued)

OTHER PUBLICATIONS

Thiemann, Joachin, "A Sparse Auditory Envelope Representation with Iterative Reconstruction for Audio Coding," Department of Electrical & Computer Engineering McGill University, Montreal, Canada, pp. 1-168, Apr. 5, 2011.
(Continued)

*Primary Examiner* — Charlotte M Baker

(57) ABSTRACT

The present document relates to audio source coding systems. In particular, the present document relates to audio source coding systems which make use of linear prediction in combination with a filterbank. A method for estimating a first sample (615) of a first subband signal in a first subband of an audio signal is described. The first subband signal of the audio signal is determined using an analysis filterbank (612) comprising a plurality of analysis filters which provide a plurality of subband signals in a plurality of subbands from the audio signal, respectively. The method comprises determining a model parameter (613) of a signal model; determining a prediction coefficient to be applied to a previous sample (614) of a first decoded subband signals derived from the first subband signal, based on the signal model,
(Continued)

based on the model parameter (613) and based on the analysis filterbank (612); wherein a time slot of the previous sample (614) is prior to a time slot of the first sample (615); and determining an estimate of the first sample (615) by applying the prediction coefficient to the previous sample (614).

20 Claims, 5 Drawing Sheets

(51) Int. Cl.
    *G06F 17/50*     (2006.01)
    *G10L 19/005*     (2013.01)
    *G10L 19/032*     (2013.01)
    *G10L 19/06*     (2013.01)
    *G10L 19/26*     (2013.01)

(52) U.S. Cl.
    CPC ........ *G10L 19/005* (2013.01); *G10L 19/0212* (2013.01); *G10L 19/032* (2013.01); *G10L 19/06* (2013.01); *G10L 19/265* (2013.01)

(58) Field of Classification Search
    USPC .................................................. 704/205, 226
    See application file for complete search history.

(56) References Cited

U.S. PATENT DOCUMENTS

| | | |
|---|---|---|
| 7,272,556 B1 | 9/2007 | Aguilar |
| 8,484,019 B2 | 7/2013 | Hedelin |
| 8,494,863 B2 | 7/2013 | Biswas |
| 2006/0015329 A1 | 1/2006 | Chu |
| 2010/0121646 A1 | 5/2010 | Ragot |
| 2010/0217607 A1 | 8/2010 | Neuendorf |
| 2011/0173011 A1 | 7/2011 | Geiger |
| 2011/0178795 A1 | 7/2011 | Bayer |
| 2011/0200198 A1 | 8/2011 | Grill |
| 2011/0295598 A1 | 12/2011 | Yang |
| 2012/0029923 A1 | 2/2012 | Rajendran |

FOREIGN PATENT DOCUMENTS

| | | |
|---|---|---|
| JP | H10-511243 | 10/1998 |
| JP | 2004-053891 | 2/2004 |
| JP | 2007-171821 | 7/2007 |
| JP | 2007-519027 | 7/2007 |
| KR | 10-2006-0037375 | 5/2006 |
| WO | 02/29786 | 4/2002 |

OTHER PUBLICATIONS

Gersho, Allen, "Advances in Speech and Audio Compression," Proceeding of the IEEE, vol. 82, No. 6, pp. 900-918, Jun. 1994.

Nanjundaswamy, Tejaswi et al., "Bidirectional Cascaded Long Term Prediction for Frame Loss Concealment in Polyphonic Audio Signals," Department of Electrical and Computer Engineering, University of California, Santa Barbara, Mar. 2012 IEEE, pp. 417-420.

Nanjundaswamy, Tejaswi et al., "Cascaded Long Term Predication for Coding Polyphonic Audio Signal," Department of Electrical and Computer Engineering, University of California, Santa Barbara, Oct. 16-19, 2011, IEEE, pp. 21-24.

Ravelli, Emmanuel et al., "Joint Optimization of the Perceptual Core and Lossless Compression Layers in Scalable Audio Coding," Department of Electrical and Computer Engineering, University of California, Santa Barbara, Mar. 14-19, 2010 IEEE, pp. 365-368.

Nanjundaswamy, Tejaswi et al., "Perceptual Distortion-Rate Optimization of Long Term Prediction in MPEG AAC," Signal Compression Lab, Department of ECE, University of California, Santa Barbara, Nov. 7, 2010, pp. 1-106.

Nanjundaswamy, Tejaswi et al., "Perceptually Optimized Cascaded Long Term Prediction of Polyphonic Signals for Enhanced MPEG-AAC," Signal Compression Lab, Department of ECE, University of California, Santa Barbara, Oct. 21, 2011, pp. 1-146.

Motlicek, Petr et al., "Wide-Band Perceptual Audio Coding Based on Frequency-Domain Linear Prediction," IDIAP Research Institute, Martigny, Switzerland, ICSI, Berkeley, CA, Apr. 15-20, 2007 IEEE, pp. 265-268.

MODEL BASED PREDICTION IN A CRITICALLY SAMPLED FILTERBANK

TECHNICAL FIELD

The present document relates to audio source coding systems. In particular, the present document relates to audio source coding systems which make use of linear prediction in combination with a filterbank.

BACKGROUND

There are two important signal processing tools applied in systems for source coding of audio signals, namely critically sampled filterbanks and linear prediction. Critically sampled filterbanks (e.g. modified discrete cosine transform, MDCT, based filterbanks) enable direct access to time-frequency representations where perceptual irrelevancy and signal redundancy can be exploited. Linear prediction enables the efficient source modeling of audio signals, in particular of speech signals. The combination of the two tools, i.e. the use of prediction in the subbands of a filterbank, has mainly been used for high bit rate audio coding. For low bit rate coding, a challenge with prediction in the subbands is to keep the cost (i.e. the bit rate) for the description of the predictors low. Another challenge is to control the resulting noise shaping of the prediction error signal obtained by a subband predictor.

For the challenge of encoding the description of the subband predictor in a bit-efficient manner, a possible path is to estimate the predictor from previously decoded portions of the audio signal and to thereby avoid the cost of a predictor description altogether. If the predictor can be determined from previously decoded portions of the audio signal, the predictor can be determined at the encoder and at the decoder, without the need of transmitting a predictor description from the encoder to the decoder. This scheme is referred to as a backwards adaptive prediction scheme. However, the backwards adaptive prediction scheme typically degrades significantly when the bit rate of the encoded audio signal decreases. An alternative or additional path to the efficient encoding of a subband predictor is to identify a more natural predictor description, e.g. a description which exploits the inherent structure of the to-be-encoded audio signal. For instance, low bit rate speech coding typically applies a forward adaptive scheme based on a compact representation of a short term predictor (exploiting short term correlations) and a long time predictor (exploiting long term correlations due to an underlying pitch of the speech signal).

For the challenge of controlling the noise shaping of the prediction error signal, it is observed that while the noise shaping of a predictor may be well controlled inside of a subband, the final output audio signal of the encoder typically exhibits alias artifacts (except for audio signals exhibiting a substantially flat spectral noise shape).

An important case of a subband predictor is the implementation of long term prediction in a filterbank with overlapping windows. A long term predictor typically exploits the redundancies in periodic and near periodic audio signals (such as speech signals exhibiting an inherent pitch), and may be described with a single or a low number of prediction parameters. The long term predictor may be defined in continuous time by means of a delay which reflects the periodicity of the audio signal. When this delay is large compared to the length of the filterbank window, the long term predictor can be implemented in the discrete time domain by means of a shift or a fractional delay and may be converted back into a causal predictor in the subband domain. Such a long term predictor typically does not exhibit alias artifacts, but there is a significant penalty in computational complexity caused by the need for additional filterbank operations for the conversion from the time domain to the subband domain. Furthermore, the approach of determining the delay in the time domain and of converting the delay into a subband predictor is not applicable for the case where the period of the to-be-encoded audio signal is comparable or smaller than the filterbank window size.

The present document addresses the above mentioned shortcomings of subband prediction. In particular, the present document describes methods and systems which allow for a bit-rate efficient description of subband predictors and/or which allow for a reduction of alias artifacts caused by subband predictors. In particular, the method and systems described in the present document enable the implementation of low bit rate audio coders using subband prediction, which cause a reduced level of aliasing artifacts.

SUMMARY

The present document describes methods and systems which improve the quality of audio source coding employing prediction in the subband domain of a critically sampled filterbank. The methods and systems may make use of a compact description of subband predictors, wherein the description is based on signal models. Alternatively or in addition, the methods and systems may make use of an efficient implementation of predictors directly in the subband domain. Alternatively or in addition, the methods and systems may make use of cross subband predictor terms, as described in the present document, to allow for a reduction of alias artifacts.

As outlined in the present document, the compact description of subband predictors may comprise the frequency of a sinusoid, the period of a periodical signal, a slightly inharmonic spectrum as encountered for the vibration of a stiff string, and/or a multitude of pitches for a polyphonic signal. It is shown that for the case of a long term predictor, the periodical signal model provides high quality causal predictors for a range of lag parameters (or delays) that includes values which are shorter and/or longer than the window size of the filterbank. This means that a periodical signal model may be used to implement a long term subband predictor in an efficient manner A seamless transition is provided from sinusoidal model based prediction to the approximation of an arbitrary delay.

The direct implementation of predictors in the subband domain enables explicit access to perceptual characteristics of the produced quantization distortions. Furthermore, the implementation of predictors in the subband domain enables access to numerical properties such as the prediction gain and the dependence of the predictors on the parameters. For instance, a signal model based analysis can reveal that the prediction gain is only significant in a subset of the considered subbands, and the variation of the predictor coefficients as a function of the parameter chosen for transmission can be helpful in the design of parameter formats, as well as efficient encoding algorithms. Moreover, the computational complexity may be reduced significantly compared to predictor implementations that rely on the use of algorithms operating both in the time domain and in the subband domain. In particular, the methods and systems described in the present document may be used to implement subband prediction directly in the subband domain without the need for determining and applying a predictor (e.g. a long term delay) in the time domain.

The use of cross-subband terms in the subband predictors enables significantly improved frequency domain noise shaping properties compared to in-band predictors (which solely rely on in-band prediction). By doing this, aliasing artifacts can be reduced, thereby enabling the use of subband prediction for relatively low bit rate audio coding systems.

According to an aspect, a method for estimating a first sample of a first subband of an audio signal is described. The first subband of the audio signal may have been determined using an analysis filterbank comprising a plurality of analysis filters which provide a plurality of subband signals in a plurality of subbands, respectively, from the audio signal. The time domain audio signal may be submitted to an analysis filterbank, thereby yielding a plurality of subband signals in a plurality of subbands. Each of the plurality of subbands typically covers a different frequency range of the audio signal, thereby providing access to different frequency components of the audio signal. The plurality of subbands may have an equal or a uniform subband spacing. The first subband corresponds to one of the plurality of subbands provided by the analysis filterbank.

The analysis filterbank may have various properties. A synthesis filterbank comprising a plurality of synthesis filters may have similar or the same properties. The properties described for the analysis filterbank and the analysis filters are also applicable to the properties of the synthesis filterbank and the synthesis filters. Typically, the combination of analysis filterbank and synthesis filterbank allow for a perfect reconstruction of the audio signal. The analysis filters of the analysis filterbank may be shift-invariant with respect to one another. Alternatively or in addition, the analysis filters of the analysis filterbank may comprise a common window function. In particular, the analysis filters of the analysis filterbank may comprise differently modulated versions of the common window function. In an embodiment, the common window function is modulated using a cosine function, thereby yielding a cosine modulated analysis filterbank. In particular, the analysis filterbank may comprise (or may correspond to) one or more of: an MDCT, a QMF, and/or an ELT transform. The common window function may have a finite duration K. The duration of the common window function may be such that succeeding samples of a subband signal are determined using overlapping segments of the time domain audio signal. As such, the analysis filterbank may comprise an overlapped transform. The analysis filters of the analysis filterbank may form an orthogonal and/or an orthonormal basis. As a further property, the analysis filterbank may correspond to a critically sampled filterbank. In particular, the number of samples of the plurality of subband signals may correspond to the number of samples of the time domain audio signal.

The method may comprise determining a model parameter of a signal model. It should be noted that the signal model may be described using a plurality of model parameters. As such, the method may comprise determining the plurality of model parameters of the signal model. The model parameter(s) may be extracted from a received bitstream which comprises or which is indicative of the model parameter and of a prediction error signal. Alternatively, the model parameter(s) may be determined by fitting the signal model to the audio signal (e.g. on a frame by frame basis), e.g. using a means square error approach.

The signal model may comprise one or more sinusoidal model components. In such a case, the model parameter may be indicative of the one or more frequencies of the one or more sinusoidal model components. By way of example, the model parameter may be indicative of a fundamental frequency $\Omega$ of a multi-sinusoidal signal model, wherein the multi-sinusoidal signal comprises sinusoidal model components at frequencies which correspond to multiples $q\Omega$ of the fundamental frequency $\Omega$. As such, the multi-sinusoidal signal model may comprise a periodic signal component, wherein the periodic signal component comprises a plurality of sinusoidal components and wherein the plurality of sinusoidal components have a frequency which is a multiple of the fundamental frequency $\Omega$. As will be shown in the present document, such a periodic signal component may be used to model a delay in the time domain (as used e.g. for long-term predictors). The signal model may comprise one or more model parameters which are indicative of a shift and/or a deviation of the signal model from a periodic signal model. The shift and/or deviation may be indicative of a deviation of the frequencies of the plurality of sinusoidal components of the periodic signal model from respective multiples $q\Omega$ of the fundamental frequency $\Omega$.

The signal model may comprise a plurality of periodic signal components. Each of the periodic signal components may be described using one or more model parameters. The model parameters may be indicative of a plurality of fundamental frequencies $\Omega_0, \Omega_1, \ldots, \Omega_{M-1}$ of the plurality of periodic signal components. Alternatively or in addition, the signal model may be described by a pre-determined and/or an adjustable relaxation parameter (which may be one of the model parameters). The relaxation parameter may be configured to even out or to smoothen the line spectrum of a periodic signal component. Specific examples of signal models and associated model parameters are described in the embodiment section of the present document.

The model parameter(s) may be determined such that a mean value of a squared prediction error signal is reduced (e.g. minimized). The prediction error signal may be determined based on the difference between the first sample and the estimate of the first sample. In particular, the mean value of the squared prediction error signal may be determined based on a plurality of succeeding first samples of the first subband signal and based on a corresponding plurality of estimated first samples. In particular, it is proposed in the present document, to model the audio signal or at least the first subband signal of the audio signal using a signal model which is described by one or more model parameters. The model parameters are used to determine the one or more prediction coefficients of a linear predictor which determines a first estimated subband signal. The difference between the first subband signal and the first estimated subband signal yields a prediction error subband signal. The one or more model parameters may be determined such that the mean value of the squared prediction error subband signal is reduced (e.g. minimized).

The method may further comprise determining a prediction coefficient to be applied to a previous sample of a first decoded subband signal derived from the first subband signal. In particular, the previous sample may be determined by adding a (quantized version) of the prediction error signal to a corresponding sample of the first subband signal. The first decoded subband signal may be identical to the first subband signal (e.g. in case of a lossless encoder). A time slot of the previous sample is typically prior to a time slot of the first sample. In particular, the method may comprise determining one or more prediction coefficients of a recursive (finite impulse response) prediction filter which is configured to determine the first sample of the first subband signal from one or more previous samples.

The one or more prediction coefficients may be determined based on the signal model, based on the model parameter and based on the analysis filterbank. In particular, a prediction coefficient may be determined based on an analytical evaluation of the signal model and of the analysis filterbank. The analytical evaluation of the signal model and of the analysis filterbank may lead to the determination of a look-up table and/or of an analytical function. As such, the prediction coefficient may be determined using the look-up table and/or the analytical function, wherein the look-up table and/or the analytical function may be pre-determined based on the signal model and based on the analysis filterbank. The look-up table and/or the analytical function may provide the prediction coefficient(s) as a function of a parameter derived from the model parameter(s). The parameter derived from the model parameter may e.g. be the model parameter or may be obtained from the model parameter using a pre-determined function. As such, the one or more prediction coefficients may be determined in a computationally efficient manner using a pre-determined look-up table and/or analytical function which provide the one or more prediction coefficients in dependence (only) of the one or more parameters derived (only) from the one or more model parameters. Hence, the determination of a prediction coefficient may be reduced to the simple look up of an entry within a look-up table.

As indicated above, the analysis filterbank may comprise or may exhibit a modulated structure. As a result of such a modulated structure, it is observed that the absolute value of the one or more prediction coefficients is independent of an index number of the first subband. This means that the look-up table and/or the analytical function may be shift-invariant (apart from a sign value) with regards to the index number of the plurality of subbands. In such cases, the parameter derived from the model parameter, i.e. the parameter which is entered to the look-up table and/or to the analytical function in order to determine the prediction coefficient may be derived by expressing the model parameter in a relative manner with respect to a subband of the plurality of subbands.

As outlined above, the model parameter may be indicative of a fundamental frequency $\Omega$ of a multi-sinusoidal signal model (e.g. of a periodic signal model). In such cases, determining the prediction coefficient may comprise determining a multiple of the fundamental frequency $\Omega$ which lies within the first subband. If a multiple of the fundamental frequency $\Omega$ lies within the first subband, a relative offset of the multiple of the fundamental frequency $\Omega$ from a center frequency of the first subband may be determined. In particular, the relative offset of the multiple of the fundamental frequency $\Omega$ which is closest to the center frequency of the first subband may be determined. The look-up table and/or the analytical function may be pre-determined such that the look-up table and/or the analytical function provide the prediction coefficient as a function of possible relative offsets from a center frequency of a subband (e.g. as a function of a normalized frequency f and/or as a function of a shift parameter $\Theta$, as described in the present document). As such, the prediction coefficient may be determined based on the look-up table and/or based on the analytical function using the determined relative offset. A pre-determined look-up table may comprise a limited number of entries for a limited number of possible relative offsets. In such a case, the determined relative offset may be rounded to the nearest possible relative offset from the limited number of possible relative offsets, prior to looking up the prediction coefficient from the look-up table.

On the other hand, if no multiple of the fundamental frequency $\Omega$ lies within the first subband, or rather, within an extended frequency range surrounding of the first subband, the prediction coefficient may be set to zero. In such cases, the estimate of the first sample may also be zero.

Determining the prediction coefficient may comprise selecting one of a plurality of look-up tables based on the model parameter. By way of example, the model parameter may be indicative of a fundamental frequency $\Omega$ of a periodic signal model. The fundamental frequency $\Omega$ of a periodic signal model corresponds to a periodicity T of the periodic signal model. It is shown in the present document that in case of relatively small periodicities T, a periodic signal model converges towards a single-sinusoidal model. Furthermore, it is shown in the present document that in case of relatively large periodicities T, the look-up tables are slowly varying with the absolute value of T and mainly depend on the relative offset (i.e. on the shift parameter $\Theta$). As such, a plurality of look-up tables may be pre-determined for a plurality of different values of the periodicity T. The model parameter (i.e. the periodicity T) may be used to select an appropriate one of the plurality of look-up tables and the prediction coefficient may be determined based on the selected one of the plurality of look-up tables (using the relative offset, e.g. using the shift parameter $\Theta$). As such, a model parameter (representing e.g. the periodicity T) which may have a relatively high precision may be decoded into a pair of parameters (e.g. the periodicity T and the relative offset) at a reduced precision. The first parameter (e.g. the periodicity T) of the pair of parameters may be used to select a particular look-up table and the second parameter (e.g. the relative offset) may be used to identify an entry within the selected look-up table.

The method may further comprise determining an estimate of the first sample by applying the prediction coefficient to the previous sample. Applying the prediction coefficient to the previous sample may comprise multiplying the prediction coefficient with the value of the previous sample, thereby yielding the estimate of the first sample. Typically, a plurality of first samples of the first subband signal is determined by applying the prediction coefficient to a sequence of previous samples. Determining an estimate of the first sample may further comprise applying a scaling gain to the prediction coefficient and/or to the first sample. The scaling gain (or an indication thereof may be used e.g. for long term prediction (LTP). In other words, the scaling gain may result from a different predictor (e.g. from a long term predictor). The scaling gain may be different for different subbands. Furthermore, the scaling gain may be transmitted as part of the encoded audio signal.

As such, an efficient description of a subband predictor (comprising one or more prediction coefficients) is provided by using a signal model which is described by a model parameter. The model parameter is used to determine the one or more prediction coefficients of the subband predictor. This means that an audio encoder does not need to transmit an indication of the one or more prediction coefficients, but an indication of the model parameter. Typically, the model parameter can be encoded more efficiently (i.e. with a lower number of bits) than the one or more prediction coefficients. Hence, the use of model based prediction enables low bit rate subband encoding.

The method may further comprise determining a prediction mask indicative of a plurality of previous samples in a plurality of prediction mask support subbands. The plurality of prediction mask support subbands may comprise at least one of the plurality of subbands, which is different from the first subband. As such, the subband predictor may be configured to estimate a sample of the first subband signal from samples of one or more other subband signals from the plurality of subband signals, which are different from the first subband signal. This is referred to in the present document as cross-subband prediction. The prediction mask may define the arrangement of the plurality of previous samples (e.g. a time lag with respect to the time slot of the first sample and/or a subband index lag with respect to the index number of the first subband) which are used to estimate the first sample of the first subband signal.

The method may proceed in determining a plurality of prediction coefficients to be applied to the plurality of previous samples. The plurality of prediction coefficients may be determined based on the signal model, based on the model parameter and based on the analysis filterbank (e.g. using the model based prediction schemes outlined above and in the present document). As such, the plurality of prediction coefficients may be determined using one or more model parameters. In other words, a limited number of model parameters may be sufficient to determine the plurality of prediction coefficients. This means that by using model based subband prediction, cross-subband prediction may be implemented in a bit-rate efficient manner.

The method may comprise determining an estimate of the first sample by applying the plurality of prediction coefficients to the plurality of previous samples, respectively. Determining an estimate of the first sample typically comprises determining the sum of the plurality of previous samples weighted by the plurality of respective prediction coefficients.

As outlined above, the model parameter may be indicative of a periodicity T. The plurality of look-up tables, which is used to determine the one or more prediction coefficients, may comprise look-up tables for different values of periodicity T. In particular, the plurality of look-up tables may comprise look-up tables for different values of periodicity T within the range of $[T_{min}, T_{max}]$ at a pre-determined step size $\Delta T$. As will be outlined in the present document, $T_{min}$ may be in the range of 0.25 and $T_{max}$, may be in the range of 2.5. $T_{min}$ may be selected such that for $T<T_{min}$, the audio signal can be modeled using a signal model comprising a single sinusoidal model component. $T_{max}$ may be selected such that for $T>T_{max}$, the look-up tables for the periodicities $T_{max}$ to $T_{max}+1$ substantially correspond to the look-up tables for the periodicities $T_{max}, -1$ to $T_{max}$. The same applies typically for the periodicities $T_{max}+n$ to $T_{max}+n+1$, for $n \geq 0$ in general.

The method may comprise determining the selected look-up table as the look-up table for the periodicity T indicated by the model parameter. After having selected the look-up table comprising or indicating the one or more prediction coefficients, a look-up parameter may be used to identify the appropriate one or more entries within the selected look-up table, which indicate the one or more prediction coefficients, respectively. The look-up parameter may correspond to or may be derived from the shift parameter $\Theta$.

The method may comprise, for a model parameter indicative of a periodicity $T>T_{max}$, determining a residual periodicity $T_r$ by subtracting an integer value from T, such that the residual periodicity $T_r$ lies in the range $[T_{max}, -1, T_{max}]$. The look-up table for determining the prediction coefficient may then be determined as the look-up table for the residual periodicity $T_r$.

The method may comprise, for a model parameter indicative of a periodicity $T<T_{min}$, selecting the look-up table for determining the one or more prediction coefficients as the look-up table for the periodicity $T_{min}$. Furthermore, the look-up parameter (e.g. the shift parameter $\Theta$) for identifying the one or more entries of the selected look-up table which provide the one or more prediction coefficients, may be scaled in accordance to the ratio $T_{min}/T$. The one or more prediction coefficients may then be determined using the selected look-up table and the scaled look-up parameter. In particular, the one or more prediction coefficients may be determined based on the one or more entries of the selected look-up table corresponding to the scaled look-up parameter.

As such, the number of look-up tables may be limited to a pre-determined range $[T_{min}, T_{max}]$, thereby limiting the memory requirements of an audio encoder/decoder. Nevertheless, the prediction coefficients may be determined for all possible values of the periodicity T using the pre-determined look-up tables, thereby enabling a computationally efficient implementation of an audio encoder/decoder.

According to a further aspect, a method for estimating a first sample of a first subband signal of an audio signal is described. As outlined above, the first subband signal of the audio signal may be determined using an analysis filterbank comprising a plurality of analysis filters which provide a plurality of subband signals in a plurality of subbands, respectively, from the audio signal. The features described above are also applicable to the method described below.

The method comprises determining a prediction mask indicative of a plurality of previous samples in a plurality of prediction mask support subbands. The plurality of prediction mask support subbands comprises at least one of the plurality of subbands, which is different from the first subband. In particular, the plurality of prediction mask support subbands may comprise the first subband and/or the plurality of prediction mask support subbands may comprise one or more of the plurality of subbands directly adjacent to the first subband.

The method may further comprise determining a plurality of prediction coefficients to be applied to the plurality of previous samples. The plurality of previous samples is typically derived from the plurality of subband signals of the audio signal. In particular, the plurality of previous samples typically corresponds to the samples of a plurality of decoded subband signals. The plurality of prediction coefficients may correspond to the prediction coefficients of a recursive (finite impulse response) prediction filter which also takes into account one or more samples of subands which are different from the first subband. An estimate of the first sample may be determined by applying the plurality of prediction coefficients to the plurality of previous samples, respectively. As such, the method enables subband prediction using one or more samples from other (e.g. adjacent) subbands. By doing this, aliasing artifacts caused by subband prediction based coders may be reduced.

The method may further comprise determining a model parameter of a signal model. The plurality of prediction coefficients may be determined based on the signal model, based on the model parameter and based on the analysis filterbank. As such, the plurality of prediction coefficients may be determined using model-based prediction as described in the present document. In particular, the plurality of prediction coefficients may be determined using a look-up table and/or an analytical function. The look-up table and/or the analytical function may be pre-determined based on the signal model and based on the analysis filterbank. Furthermore, the look-up table and/or the analytical function may provide the plurality of prediction coefficients (only) as a function of a parameter derived from the model parameter. Hence, the model parameter may directly provide the plurality of prediction coefficients using the look-up table and/or the analytical function. As such, the model parameter may be used to efficiently describe the coefficient of a cross-subband predictor. According to a further aspect, a method for encoding an audio signal is described. The method may comprise determining a plurality of subband signals from the audio signal using an analysis filterbank comprising a plurality of analysis filters. The method may proceed in estimating samples of the plurality of subband signals using any one of the prediction methods described in the present document, thereby yielding a plurality of estimated subband signals. Furthermore, samples of a plurality of prediction error subband signals may be determined based on corresponding samples of the plurality of subband signals and samples of the plurality of estimated subband signals. The method may proceed in quantizing the plurality of prediction error subband signals, and in generating an encoded audio signal. The encoded audio signal may be indicative of (e.g. may comprise) the plurality of quantized prediction error subband signals. Furthermore, the encoded signal may be indicative of (e.g. may comprise) one or more parameters used for estimating the samples of the plurality of estimated subband signals, e.g. indicative of one or more model parameters used for determining one or more prediction coefficients which are then used for estimating the samples of the plurality of estimated subband signals.

According to another aspect, a method for decoding an encoded audio signal is described. The encoded audio signal is typically indicative of a plurality of quantized prediction error subband signals and of one or more parameters to be used for estimating samples of a plurality of estimated subband signals. The method may comprise de-quantizing the plurality of quantized prediction error subband signals, thereby yielding a plurality of de-quantized prediction error subband signals. Furthermore, the method may comprise estimating samples of the plurality of estimated subband signals using any of the prediction methods described in the present document. Samples of a plurality of decoded subband signals may be determined based on corresponding samples of the plurality of estimated subband signals and based on samples of the plurality of de-quantized prediction error subband signals. A decoded audio signal may be determined from the plurality of decoded subband signals using a synthesis filterbank comprising a plurality of synthesis filters.

According to a further aspect, a system configured to estimate one or more first samples of a first subband signal of an audio signal is described. The first subband signal of the audio signal may be determined using an analysis filterbank comprising a plurality of analysis filters which provide a plurality of subband signals from the audio signal in a plurality of respective subbands. The system may comprise a predictor calculator configured to determine a model parameter of a signal model. Furthermore, the predictor calculator may be configured to determine one or more prediction coefficients to be applied to one or more previous samples of a first decoded subband signal derived from the first subband signal. As such, the predictor calculator may be configured to determine one or more prediction coefficients of a recursive prediction filter, notably of a recursive subband prediction filter. The one or more prediction coefficients may be determined based on the signal model, based on the model parameter and based on the analysis filterbank (e.g. using the model-based prediction methods described in the present document). Time slots of the one or more previous samples are typically prior to time slots of the one or more first samples. The system may further comprise a subband predictor configured to determine an estimate of the one or more first samples by applying the one or more prediction coefficients to the one or more previous samples.

According to another aspect, a system configured to estimate one or more first samples of a first subband signal of an audio signal is described. The first suband signal corresponds to a first subband of a plurality of subbands. The first subband signal is typically determined using an analysis filterbank comprising a plurality of analysis filters which provide a plurality of subband signals for the plurality of subbands, respectively. The system comprises a predictor calculator configured to determine a prediction mask indicative of a plurality of previous samples in a plurality of prediction mask support subbands. The plurality of prediction mask support subbands comprises at least one of the plurality of subbands, which is different from the first subband. The predictor calculator is further configured to determine a plurality of prediction coefficients (or a recursive prediction filter) to be applied to the plurality of previous samples. Furthermore, the system comprises a subband predictor configured to determine an estimate of the one or more first samples by applying the plurality of prediction coefficients to the plurality of previous samples, respectively.

According to another aspect, an audio encoder configured to encode an audio signal is described. The audio encoder comprises an analysis filterbank configured to determine a plurality of subband signals from the audio signal using a plurality of analysis filters. Furthermore, the audio encoder comprises a predictor calculator and a subband predictor as described in the present document, which are configured to estimate samples of the plurality of subband signals, thereby yielding a plurality of estimated subband signals. In addition, the encoder may comprise a difference unit configured to determine samples of a plurality of prediction error subband signals based on corresponding samples of the plurality of subband signals and of the plurality of estimated subband signals. A quantizing unit may be used to quantize the plurality of prediction error subband signals. Furthermore, a bitstream generation unit may be configured to generate an encoded audio signal indicative of the plurality of quantized prediction error subband signals and of one or more parameters (e.g. one or more model parameters) used for estimating the samples of the plurality of estimated subband signals. According to a further aspect, an audio decoder configured to decode an encoded audio signal is described. The encoded audio signal is indicative of (e.g. comprises) the plurality of quantized prediction error subband signals and one or more parameters used for estimating samples of a plurality of estimated subband signals. The audio decoder may comprise an inverse quantizer configured to de-quantizing the plurality of quantized prediction error subband signals, thereby yielding a plurality of de-quantized prediction error subband signals. Furthermore, the decoder comprises a predictor calculator and a subband predictor as described in the present document, which are configured to estimate samples of the plurality of estimated subband signals. A summing unit may be used to determine samples of a plurality of decoded subband signals based on corresponding samples of the plurality of estimated subband signals and based on samples of the plurality of de-quantized prediction error subband signals. Furthermore, a synthesis filterbank may be used to determine a decoded audio signal from the plurality of decoded subband signals using a plurality of synthesis filters.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The present invention is described below by way of illustrative examples, not limiting the scope or spirit of the invention, with reference to the accompanying drawings, in which.

DETAILED DESCRIPTION

The below-described embodiments are merely illustrative for the principles of the present invention for model based prediction in a critically sampled filterbank. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Figure 1:
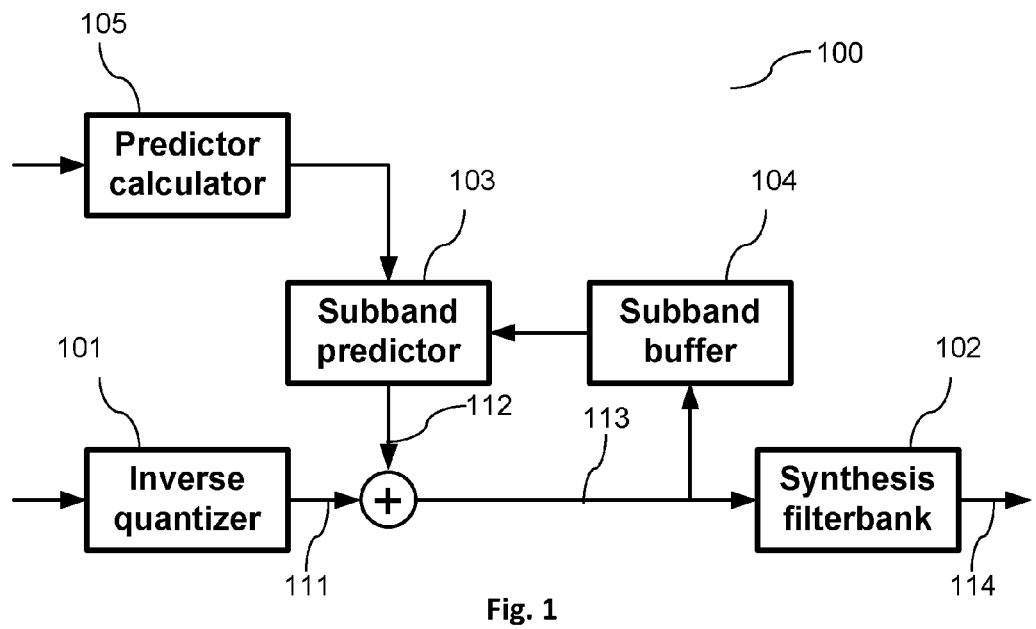
FIG. 1 depicts the block diagram of an example audio decoder applying linear prediction in a filterbank domain (i.e. in a subband domain)

FIG. 1 depicts the block diagram of an example audio decoder 100 applying linear prediction in a filterbank domain (also referred to as subband domain). The audio decoder 100 receives a bit stream comprising information regarding a prediction error signal (also referred to as the residual signal) and possibly information regarding a description of a predictor used by a corresponding encoder to determine the prediction error signal from an original input audio signal. The information regarding the prediction error signal may relate to subbands of the input audio signal and the information regarding a description of the predictor may relate to one or more subband predictors.

Given the received bit stream information, the inverse quantizer 101 may output samples 111 of the prediction error subband signals. These samples may be added to the output 112 of the subband predictor 103 and the sum 113 may be passed to a subband buffer 104 which keeps a record of previously decoded samples 113 of the subbands of the decoded audio signal. The output of the subband predictor 103 may be referred to as the estimated subband signals 112. The decoded samples 113 of the subbands of the decoded audio signal may be submitted to a synthesis filterbank 102 which converts the subband samples to the time domain, thereby yielding time domain samples 114 of the decoded audio signal.

In other words, the decoder 100 may operate in the subband domain. In particular, the decoder 100 may determine a plurality of estimated subband signals 112 using the subband predictor 103. Furthermore, the decoder 100 may determine a plurality of residual subband signals 111 using the inverse quantizer 101. Respective pairs of the plurality of estimated subband signals 112 and the plurality of residual subband signals 111 may be added to yield a corresponding plurality of decoded subband signals 113. The plurality of decoded subband signals 113 may be submitted to a synthesis filterbank 102 to yield the time domain decoded audio signal 114.

In an embodiment of the subband predictor 103, a given sample of a given estimated subband signal 112 may be obtained by a linear combination of subband samples in the buffer 104 which corresponds to a different time and to a different frequency (i.e. different subband) than the given sample of the given estimated subband signal 112. In other words, a sample of an estimated subband signal 112 at a first time instant and in a first suband may be determined based on one or more samples of the decoded subband signals 113 which relate to a second time instant (different from the first time instant) and which relate to a second subband (different from the first subband). The collection of prediction coefficients and their attachment to a time and frequency mask may define the predictor 103, and this information may be furnished by the predictor calculator 105 of the decoder 100. The predictor calculator 105 outputs the information defining the predictor 103 by means of a conversion of signal model data included in the received bit stream. An additional gain may be transmitted which modifies the scaling of the output of the predictor 103. In an embodiment of the predictor calculator 105, the signal model data is provided in the form of an efficiently parametrized line spectrum, wherein each line in the parametrized line spectrum, or a group of subsequent lines of the parametrized line spectrum, is used to point to tabulated values of predictor coefficients. As such, the signal model data provided within the received bit stream may be used to identify entries within a predetermined look-up table, wherein the entries from the look-up table provide one or more values for the predictor coefficients (also referred to as the prediction coefficients) to be used by the predictor 103. The method applied for the table look-up may depend on the trade-offs between complexity and memory requirements. For instance, a nearest neighbor type look-up may be used to achieve the lowest complexity, whereas an interpolating look-up method may provide similar performance with a smaller table size.

As indicated above, the received bit stream may comprise one or more explicitly transmitted gains (or explicitly transmitted indications of gains). The gains may be applied as part of or after the predictor operation. The one or more explicitly transmitted gains may be different for different subbands. The explicitly transmitted (indications of) additional gains are provided in addition to one or more model parameters which are used to determined the prediction coefficients of the predictor 103. As such, the additional gains may be used to scale the prediction coefficients of the predictor 103.

Figure 2:
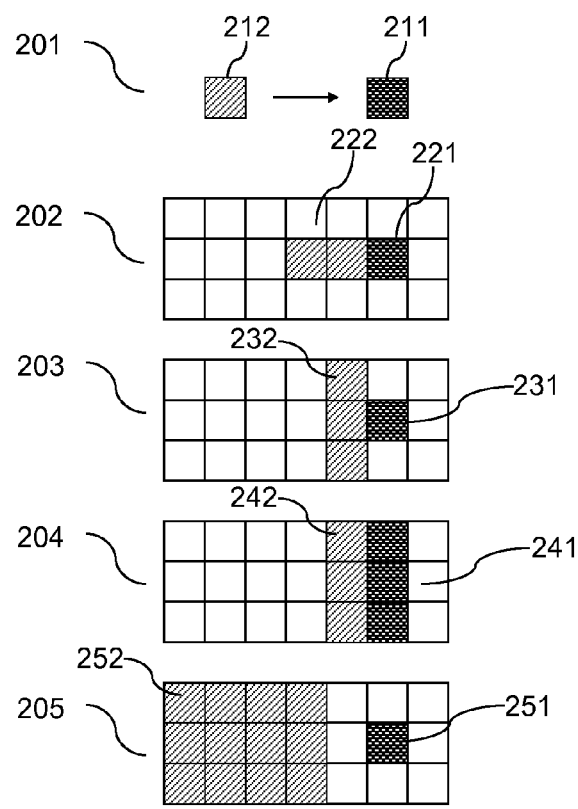
FIG. 2 shows example prediction masks in a time frequency grid.

FIG. 2 shows example prediction mask supports in a time frequency grid. The prediction mask supports may be used for predictors 103 operating in a filterbank with a uniform time frequency resolution such as a cosine modulated filterbank (e.g. an MDCT filterbank). The notation is illustrated by diagram 201, in that a target darkly shaded subband sample 211 is the output of a prediction based on a lightly shaded subband sample 212. In the diagrams 202-205, the collection of lightly shaded subband samples indicates the predictor mask support. The combination of source subband samples 212 and target subband samples 211 will be referred to as a prediction mask 201. A time-frequency grid may be used to arrange subband samples in the vicinity of the target subband sample. The time slot index is increasing from left to right and the subband frequency index is increasing from bottom to top. FIG. 2 shows example cases of prediction masks and predictor mask supports and it should be noted that various other prediction masks and predictor mask supports may be used. The example prediction masks are:

Prediction mask 202 defines in-band prediction of an estimated subband sample 221 at time instant k from two previous decoded subband samples 222 at time instants k−1 and k−2.

Prediction mask 203 defines cross-band prediction of an estimated subband sample 231 at time instant k and in subband n based on three previous decoded subband samples 232 at time instant k−1 and in subbands n−1, n, n+1.

Prediction mask 204 defines cross-band prediction of three estimated subband samples 241 at time instant k and in three different subbands n−1, n, n+1 based on three previous decoded subband samples 242 at time instant k−1 and in subbands n−1, n, n+1. The cross-band prediction may be performed such that each estimated subband sample 241 may be determined based on all of the three previous decoded subband samples 242 in the subbands n−1, n, n+1.

Prediction mask 205 defines cross-band prediction of an estimated subband sample 251 at time instant k and in subband n based on twelve previous decoded subband samples 252 at time instants k−2, k−3, k−4, k−5 and in subbands n−1, n, n+1.

Figure 3:
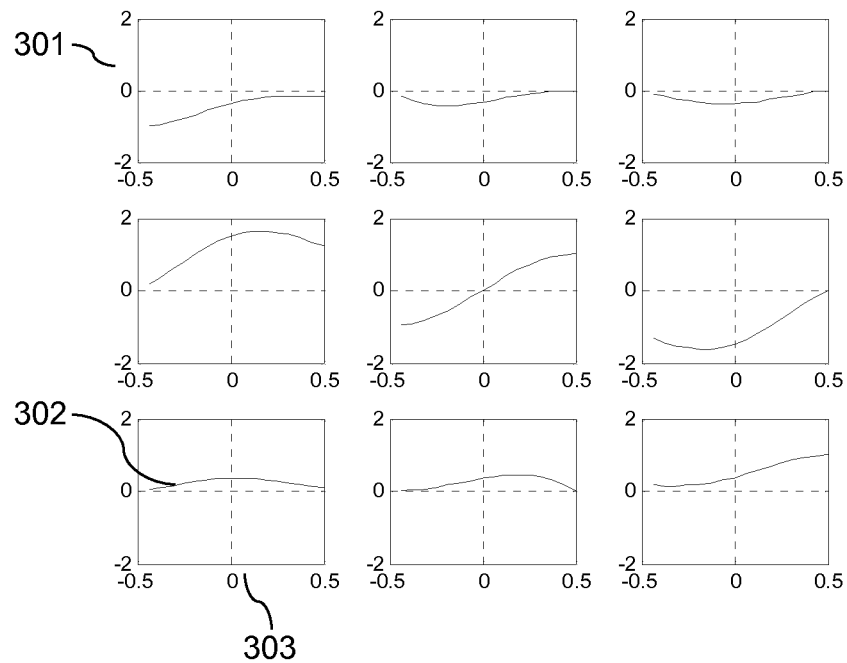
FIG. 3 illustrates example tabulated data for a sinusoidal model based predictor calculator.

FIG. 3 illustrates tabulated data for a sinusoidal model based predictor calculator 105 operating in a cosine modulated filterbank. The prediction mask support is that of diagram 204. For a given frequency parameter, the subband with the nearest subband center frequency may be selected as central target subband. The difference between the frequency parameter and the center frequency of the central target subband may be computed in units of the frequency spacing of the filterbank (bins). This gives a value between −0.5 and 0.5 which may be rounded to the nearest available entry in the tabulated data, depicted by the abscissas of the nine graphs 301 of FIG. 3. This produces a 3×3 matrix of coefficients which is to be applied to the most recent values of the plurality of decoded subband signals 113 in the subband buffer 104 of the target subband and its two adjacent subbands. The resulting 3×1 vector constitutes the contribution of the subband predictor 103 to these three subbands for the given frequency parameter. The process may be repeated in an additive fashion for all the sinusoidal components in the signal model.

In other words, FIG. 3 illustrates an example of a model-based description of a subband predictor. It is assumed that the input audio signal comprises one or more sinusoidal components at fundamental frequencies $\Omega_0, \Omega_1, \ldots, \Omega_{M-1}$. For each of the one or more sinusoidal components, a subband predictor using a pre-determined prediction mask (e.g. the prediction mask 204) may be determined A fundamental frequency $\Omega$ of the input audio signal may lie within one of the subbands of the filterbank. This subband may be referred to as the central subband for this particular fundamental frequency $\Omega$. The fundamental frequency $\Omega$ may be expressed as a value ranging from −0.5 and 0.5 relative to the center frequency of the central subband. An audio encoder may transmit information regarding the fundamental frequency $\Omega$ to the decoder 100. The predictor calculator 105 of the decoder 100 may use the three-by-three matrix of FIG. 3 to determine a three-by-three matrix of prediction coefficients by determining the coefficient value 302 for the relative frequency value 303 of the fundamental frequency $\Omega$. This means that the coefficient for a subband predictor 103 using a prediction mask 204 can be determined using only the received information regarding the particular fundamental frequency $\Omega$. In other words, by modeling an input audio signal using e.g. a model of one of more sinusoidal components, a bit-rate efficient description of a subband predictor can be provided.

Figure 4:
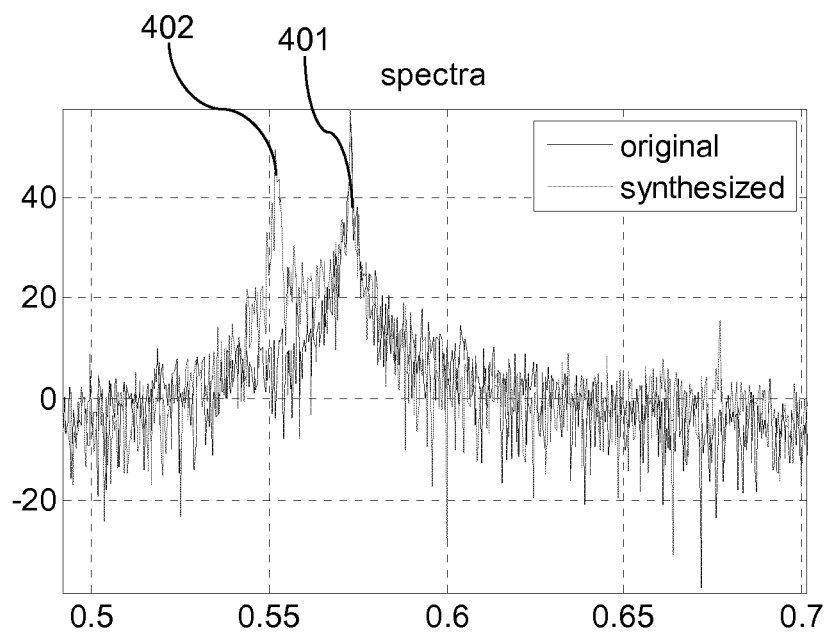
FIG. 4 illustrates example noise shaping resulting from in-band subband prediction.

FIG. 4 illustrates example noise shaping resulting from in-band subband prediction in a cosine modulated filterbank. The signal model used for performing in-band subband prediction is a second order autoregressive stochastic process with a peaky resonance, as described by a second order differential equation driven by random Gaussian white noise. The curve 401 shows the measured magnitude spectrum for a realization of the process. For this example, the prediction mask 202 of FIG. 2 is applied. That is, the predictor calculator 105 furnishes the subband predictor 103 for a given target subband 221 based on previous subband samples 222 in the same subband only. Replacing the inverse quantizer 101 by a Gaussian white noise generator leads to a synthesized magnitude spectrum 402. As can be seen, strong alias artifacts occur in the synthesis, as the synthesized spectrum 402 comprises peaks which do not coincide with the original spectrum 401.

Figure 5:
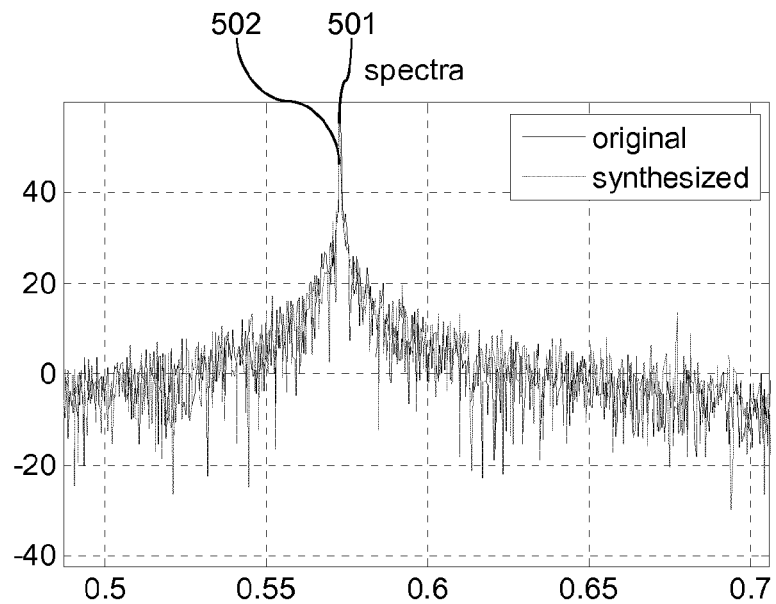
FIG. 5 illustrates example noise shaping resulting from cross-band subband prediction.

FIG. 5 illustrates the example noise shaping resulting from cross-band subband prediction. The setting is the same as that of FIG. 4, except for the fact that the prediction mask 203 is applied. Hence, calculator 105 furnishes the predictor 103 for a given target subband 231 based on previous subband samples 232 in the target subband and in its two adjacent subbands. As it can be seen from FIG. 5, the spectrum 502 of the synthesized signal substantially coincides with the spectrum 501 of the original signal, i.e. the alias problems are substantially suppressed when using cross-band subband prediction. As such, FIGS. 4 and 5 illustrate that when using cross-band subband prediction, i.e. when predicting a subband sample based on previous subband samples of one or more adjacent subbands, aliasing artifacts caused by subband prediction can be reduced. As a result, subband prediction may also be applied in the context of low bit rate audio encoders without the risk of causing audible aliasing artifacts. The use of cross-band subband prediction typically increases the number of prediction coefficients. However, as shown in the context of FIG. 3, the use of models for the input audio signal (e.g. the use of a sinusoidal model or a periodic model) allows for an efficient description of the subband predictor, thereby enabling the use of cross-band subband prediction for low bit rate audio coders.

In the following, a description of the principles of model based prediction in a critically sampled filterbank will be outlined with reference to FIGS. 1-6, and by adding appropriate mathematical terminology.

A possible signal model underlying linear prediction is that of a zero-mean weakly stationary stochastic process $x(t)$ whose statistics is determined by its autocorrelation function $r(\tau)=E\{x(t)x(t-\tau)\}$. As a good model for the critically sampled filterbanks to be considered here, one lets $\{w_\alpha : \alpha \in A\}$ be a collection of real valued synthesis waveforms $w_\alpha(t)$ constituting an orthonormal basis. In other words, the filterbank may be represented by the waveforms $\{w_\alpha : \alpha \in A\}$. Subband samples of a time domain signal $s(t)$ are obtained by inner products $$\langle s, w_\alpha \rangle = \int_{-\infty}^{\infty} s(t) w_\alpha(t) \, dt, \tag{1}$$

and the signal is recovered by $$s(t) = \sum_{\alpha \in A} \langle s, w_\alpha \rangle w_\alpha(t), \tag{2}$$

The subband samples $\langle x, w_\alpha \rangle$ of the process $x(t)$ are random variables, whose covariance matrix $R_{\alpha\beta}$ is determined by the autocorrelation function $r(\tau)$ as follows $$R_{\alpha\beta} = E\{\langle x, w_\alpha \rangle \langle x, w_\beta \rangle\} = \langle W_{\alpha\beta}, r \rangle, \tag{3}$$

where $W_{\alpha\beta}(\tau)$ is the cross correlation of two synthesis waveforms $$W_{\alpha\beta}(\tau) = \int_{-\infty}^{\infty} w_\alpha(t) w_\beta(t-\tau) \, dt. \tag{4}$$

A linear prediction of the subband sample $\langle x, w_\alpha \rangle$ from a collection or decoded subband samples $\{\langle x, w_\beta \rangle : \beta \in B\}$ is defined by $$\sum_{\beta \in B} c_\beta \langle x, w_\beta \rangle. \tag{5}$$

In equation (5), the set B defines the source subband samples, i.e. the set B defines the prediction mask support. The mean value of the squared prediction error is given by $$E\left\{\left(\sum_{\beta \in B} c_\beta \langle x, w_\beta \rangle - \langle x, w_\alpha \rangle\right)^2\right\} = \sum_{\beta,\gamma \in B} c_\gamma R_{\gamma\beta} c_\beta - 2\sum_{\beta \in B} R_{\alpha\beta} c_\beta + R_{\alpha\alpha}, \tag{6}$$

and the least mean square error (MSE) solution is obtained by solving the normal equations for the prediction coefficients $c_\beta$, $$\sum_{\beta \in B} R_{\gamma\beta} c_\beta = R_{\gamma\alpha}, \gamma \in B. \tag{7}$$

When the prediction coefficients satisfy equation (7), the right hand side of equation (6) reduces to $R_{\alpha\alpha} - \Sigma_\beta R_{\alpha\beta} c_\beta$. The normal equations (7) may be solved in an efficient manner using e.g. the Levinson-Durbin algorithm.

It is proposed in the present document to transmit a parametric representation of a signal model from which the prediction coefficients $\{c_\beta : \beta \in B\}$ can be derived in the predictor calculator 105. For example, the signal model may provide a parametric representation of the autocorrelation function $r(\tau)$ of the signal model. The decoder 100 may derive the autocorrelation function $r(\tau)$ using the received parametric representation and may combine the autocorrelation function $r(\tau)$ with the synthesis waveform cross correlation $W_{\alpha\beta}(\tau)$ in order to derive the covariance matrix entries required for the normal equations (7). These equations may then be solved to obtain the prediction coefficients.

In other words, a to-be-encoded input audio signal may be modeled by a process $x(t)$ which can be described using a limited number of model parameters. In particular, the modeling process $x(t)$ may be such that its autocorrelation function $r(\tau) = E\{x(t)x(t-\tau)\}$ can be described using a limited number of parameters. The limited number of parameters for describing the autocorrelation function $r(\tau)$ may be transmitted to the decoder 100. The predictor calculator 105 of the decoder 100 may determine the autocorrelation function $r(\tau)$ from the received parameters and may use equation (3) to determine the covariance matrix $R_{\alpha\beta}$ of the subband signals from which the normal equation (7) can be determined. The normal equation (7) can then be solved by the predictor calculator 105, thereby yielding the prediction coefficients $c_\beta$.

In the following, example signal models are described which may be used to apply the above described model based prediction scheme in an efficient manner. The signal models described in the following are typically highly relevant for coding audio signals, e.g. for coding speech signals.

An example of a signal model is given by the sinusoidal process $$x(t) = a \cos(\xi t) + b \sin(\xi t), \tag{8}$$

where the random variables a,b are uncorrelated, have zero mean, and variance one. The autocorrelation function of this sinusoidal process is given by $$r(\tau) = \cos(\xi \tau). \tag{9}$$

A generalization of such a sinusoidal process is a multi-sine model comprising a set of (angular) frequencies S, i.e. comprising a plurality of different (angular) frequencies $\xi$, $$x(t) = \sum_{\xi \in S} a_\xi \cos(\xi t) + b_\xi \sin(\xi t). \tag{10}$$

Assuming that all the random variables $a_\xi$, $b_\xi$ are pairwise uncorrelated, have zero mean, and variance one, the multi-sine process has the autocorrelation function $$r(\tau) = \sum_{\xi \in S} \cos(\xi \tau). \quad (11)$$

The power spectral density (PSD) of the multi-sine process (which corresponds to the Fourier transform of the autocorrelation function), is the line spectrum $$P(\omega) = \frac{1}{2} \sum_{\xi \in S} (\delta(\omega - \xi) + \delta(\omega + \xi)). \quad (12)$$

Numerical considerations can lead to the replacement of the pure multi-sine process with the autocorrelation function of equation process with a relaxed multi-sine process having the autocorrelation function $$r(\tau) = \exp(-\varepsilon|\tau|) \sum_{\xi \in S} \cos(\xi \tau)$$

where $\in > 0$ being a relatively small relaxation parameter. The latter model leads to a strictly positive PSD without impulse functions.

Examples of compact descriptions of the set S of frequencies of a multi-sine model are as follows
1. A single fundamental frequency $\Omega$: $S=\{\Omega v: v=1, 2, \ldots\}$
2. M fundamental frequencies: $\Omega_0, \Omega_1, \ldots, \Omega_{M-1}$: $S=\{\Omega_k v: v=1, 2, \ldots, k=0, 1, \ldots M-1\}$
3. A single side band shifted fundamental frequency $\Omega,\theta$: $S=\{\Omega(v+\theta): v=1, 2, \ldots\}$
4. A slightly inharmonic model: $\Omega,a$: $S=\{\Omega v \cdot (1+av^2)^{1/2}: v=1, 2, \ldots\}$, with a describing the inharmonic component of the model.

As such, a (possibly relaxed) multi-sine model exhibiting a PSD given by equation (12) may be described in an efficient manner using one of the example descriptions listed above. By way of example, a complete set S of frequencies of the line spectrum of equation (12) may be described using only a single fundamental frequency $\Omega$. If the to-be-encoded input audio signal can be well described using a multi-sine model exhibiting a single fundamental frequency $\Omega$, the model based predictor may be described by a single parameter (i.e. by the fundamental frequency $\Omega$), regardless the number of prediction coefficients (i.e. regardless the prediction mask 202, 203, 204, 205) used by the subband predictor 103.

Case 1 for describing the set S of frequencies yields a process x(t) which models input audio signals with a period $T=2\pi/\Omega$. Upon inclusion of the zero frequency (DC) contribution with variance ½ to equation (11) and subject to rescaling of the result by the factor 2/T, the autocorrelation function of the periodic model process x(t) may be written as $$r(\tau) = \sum_{k \in Z} \delta(\tau - kT). \quad (13)$$

With the definition of a relaxation factor $\rho=\exp(-T\in)$, the autocorrelation function of the relaxed version of the periodic model is given by $$r(\tau) = \sum_{k \in Z} \rho^{|k|} \delta(\tau - kT). \quad (14)$$

Equation (14) also corresponds to the autocorrelation function of a process defined by a single delay loop fed with white noise z(t), that is, of the model process $$x(t)=\rho x(t-T)+\sqrt{1-\rho^2}z(t). \quad (15)$$

This means that the periodic process which exhibits a single fundamental frequency $\Omega$ corresponds to a delay in the time domain, with the delay being $T=2\pi/\Omega$.

The above mentioned global signal models typically have a flat large scale power spectrum, due to the unit variance assumption of the sinusoidal amplitude parameters $a_\xi, b_\xi$. It should be noted, however, that the signal models are typically only considered locally for a subset of subbands of a critically sampled filterbank, wherein the filterbank is instrumental in the shaping of the overall spectrum. In other words, for a signal that has a spectral shape with slow variation compared to the subband widths, the flat power spectrum models will provide a good match to the signal, and subsequently, the modelbased predictors will offer adequate levels of prediction gain.

More generally, the PSD model could be described in terms of standard parameterizations of autoregressive (AR) or autoregressive moving average (ARMA) processes. This would increase the performance of model-based prediction at the possible expense of an increase in descriptive model parameters.

Another variation is obtained by abandoning the stationarity assumption for the stochastic signal model. The autocorrelation function then becomes a function of two variables $r(t,s)=E\{x(t)x(s)\}$.

For instance, relevant non-stationary sinusoidal models may include amplitude (AM) and frequency modulation (FM).

Furthermore, a more deterministic signal model may be employed. As will be seen in some of the examples below, the prediction can have a vanishing error in some cases. In such cases, the probabilistic approach can be avoided. When the prediction is perfect for all signals in a model space, there is no need to perform a mean value of prediction performance by means of a probability measure on the considered model space.

In the following, various aspects regarding modulated filterbanks are described. In particular, aspects are described which have an influence on the determination of the covariance matrix, thereby providing efficient means for determining the prediction coefficients of a subband predictor. A modulated filterbank may be described as having a two-dimensional index set of synthesis waveforms $\alpha=(n,k)$ where $n=0, 1, \ldots$ is the subband index (frequency band) and where $k \in Z$ is the subband sample index (time slot). For ease of exposition, it is assumed that the synthesis waveforms are given in continuous time and are normalized to a unit time stride, $$w_{n,k}(t)=u_n(t-k), \quad (16)$$

where $$u_n(t)=v(t)\cos[\pi(n+\tfrac{1}{2})(t+\tfrac{1}{2})], \quad (17)$$

in case of a cosine modulated filterbank. It is assumed that the window function v(t) is real valued and even. Up to minor variations of the modulation rule, this covers a range of highly relevant cases such as MDCT (Modified Discrete Cosine Transform), QMF (Quadrature Mirror Filter), and ELT (Extended Lapped Transforms) with L subbands upon sampling at a time step 1/L. The window is supposed to be of finite duration or length with support included in the interval [−K/2,K/2], where K is the overlap factor of the overlapped transform and where K indicates the length of the window function.

Due to the shift invariant structure, one finds that the cross correlation function of the synthesis waveform (as defined in equation (4)) can be written as $$W_{n,k,m,l}(\tau) = \int_{-\infty}^{\infty} w_{n,k}(t) W_{m,l}(t-\tau)\,dt = \int_{-\infty}^{\infty} u_n(t) u_m(t-l+k-\tau)\,dt. \quad (18)$$

That is $W_{n,k,m,l}(\tau) = U_{n,m}(\tau-l+k)$, with the definition $U_{n,m}(\tau) = W_{n,0,m,0}(\tau)$. The modulation structure (17) allows for further expansion into $$U_{n,m}(\tau) = \frac{1}{2}\kappa_{n-m}(\tau)\cos\frac{\pi}{2}[(n+m+1)\tau + (n-m)] + \frac{1}{2}\kappa_{n+m+1}(\tau)\cos\frac{\pi}{2}[(n-m)\tau + (n+m+1)]. \quad (19)$$

where the kernel function $\kappa_\nu$ represents a sampling with the filterbank subband step in the frequency variable of the Wigner-Ville distribution of the filterbank window $$\kappa_\nu(\tau) = \int_{-\infty}^{\infty} v\left(t+\frac{\tau}{2}\right) v\left(t-\frac{\tau}{2}\right)\cos(\pi\nu t)\,dt. \quad (20)$$

The kernel is real and even in both $\nu$ and $\tau$, due to the above mentioned assumptions on the window function $v(t)$. Its Fourier transform is the product of shifted window responses, $$\hat{\kappa}_\nu(\omega) = \hat{v}\left(\omega + \frac{\pi}{2}\nu\right)\hat{v}\left(\omega - \frac{\pi}{2}\nu\right). \quad (21)$$

It can be seen from equations (20) and (21) that the kernel $\kappa_\nu(\tau)$ vanishes for $|\tau|>K$ and has a rapid decay as a function of $|\nu|$ for typical choices of filterbank windows $v(t)$. As a consequence, the second term of equation (19) involving $\nu=n+m+1$ can often be neglected except for the lowest subbands.

For the autocorrelation function $r(\tau)$ of a given signal model, the above mentioned formulas can be inserted into the definition of the subband sample covariance matrix given by equation (3). One gets $R_{n,k,m,l}=R_{n,m}[k-l]$ with the definition $$R_{n,m}[\lambda] = \int_{-\infty}^{\infty} U_{n,m}(\tau) r(\tau+\lambda)\,d\tau. \quad (22)$$

As a function of the power spectral density $P(\omega)$ of the given signal model (which corresponds to the Fourier transform of the autocorrelation function $r(\tau)$), one finds that $$R_{n,m}[\lambda] = \frac{1}{2\pi}\int_{-\infty}^{\infty} \hat{U}_{n,m}(\omega) P(\omega)\exp(-i\omega\lambda)\,d\omega. \quad (23)$$

where $\hat{U}_{n,m}(\omega)$ is the Fourier transform of $U_{n,m}(\tau)$, where n, m identify subband indexes, and where $\lambda$ represents a time slot lag ($\lambda=k-l$). The expression of equation (23) may be rewritten as $$R_{n,m}[\lambda] = \qquad (24)$$
$$\frac{1}{4\pi}\int_{-\infty}^{\infty} \hat{\kappa}_{n-m}\left(\omega - \frac{\pi}{2}(n+m+1)\right) P(\omega)\cos\left(\omega\lambda - \frac{\pi}{2}(n-m)\right)d\omega +$$
$$\frac{1}{4\pi}\int_{-\infty}^{\infty} \hat{\kappa}_{n+m+1}\left(\omega - \frac{\pi}{2}(n-m)\right) P(\omega)\cos\left(\omega\lambda - \frac{\pi}{2}(n+m+1)\right)d\omega.$$

An important observation is that the first term of equation (24) has essentially an invariance property with respect to frequency shifts. If the second term of equation (24) is neglected and $P(\omega)$ is shifted by an integer $\nu$ times the subband spacing $\pi$ to $P(\omega-\pi\nu)$, one finds a corresponding shift in the covariances $R_{n,m}[\lambda]=\pm R_{n-\nu, m-\nu}[\lambda]$, where the sign depends on the (integer) values of the time lag $\lambda$. This reflects the advantage of using a filterbank with a modulation structure, as compared to the general filter bank case.

Equation (24) provides an efficient means for determining the matrix coefficients of the subband sample covariance matrix when knowing the PSD of the underlying signal model. By way of example, in case of a sinusoidal model based prediction scheme which makes use of a signal model $x(t)$ comprising a single sinusoid at the (angular) frequency $\xi$, the PSD is given by $P(\omega)=\frac{1}{2}(\delta(\omega-\xi)+\delta(\omega+\xi))$. Inserting $P(\omega)$ into equation (24) gives four terms of which three can be neglected under the assumption that n+m+1 is large. The remaining term becomes $$R_{n,m}[\lambda] \approx \frac{1}{8\pi}\hat{\kappa}_{n-m}\left(\xi - \frac{\pi}{2}(n+m+1)\right)\cos\left(\xi\lambda - \frac{\pi}{2}(n-m)\right) \quad (25)$$
$$= \frac{1}{8\pi}\hat{v}\left(\xi - \pi\left(n+\frac{1}{2}\right)\right)\hat{v}\left(\xi - \pi\left(m+\frac{1}{2}\right)\right)\cos\left(\xi\lambda - \frac{\pi}{2}(n-m)\right).$$

Equation (25) provides an efficient means for determining the subband covariance matrix $R_{n,m}$. A subband sample $\langle x, w_{p,0}\rangle$ can be reliably predicted by a collection of surrounding subband samples $\{\langle x, w_{n,k}\rangle : (n,k)\in B\}$ which are assumed to be influenced significantly by the considered frequency. The absolute frequency $\xi$ can be expressed in relative terms, relative to the center frequency $\pi(p+\frac{1}{2})$ of a subband, as $\xi=\pi(p+\frac{1}{2}+f)$, where p is the subband index of the subband which comprises the frequency $\xi$, and where f is a normalized frequency parameter which takes on values between −0.5 and +0.5 and which indicates the position of the frequency $\xi$ relative of the center frequency of the subband p. Having determined the subband covariance matrix $R_{n,m}$, the predictor coefficients $c_m[l]$ which are applied to a subband sample in subband m at sample index l for estimating a subband sample in subband n at sample index k are found by solving the normal equations (7), which for the case at hand can be written $$\sum_{(m,l)\in B} R_{n,m}[k-l] c_m[l] = R_{n,p}[k], \ (n,k)\in B. \quad (26)$$

In equation (26), the set B describes the prediction mask support as illustrated e.g. in FIG. 2. In other words, the set B identifies the subbands m and the sample indexes l which are used to predict a target sample.

In the following, solutions of the normal equations (26) for different prediction mask supports (as shown in FIG. 2) are provided in an exemplary manner. The example of a causal second order in-band predictor is obtained by selecting the prediction mask support B={(p,−1),(p,−2)}. This prediction mask support corresponds to the prediction mask 202 of FIG. 2. The normal equations (26) for this two tap prediction, using the approximation of equation (25), become $$\hat{v}\left(\xi - \pi\left(p + \frac{1}{2}\right)\right)^2 \sum_{l=-1,-2} \cos(\xi(k-l))c_p[l] = \quad (27)$$

$$\hat{v}\left(\xi - \pi\left(p + \frac{1}{2}\right)\right)^2 \cos(-\xi k), k = -1, -2.$$

A solution to equation (27) is given by $c_p[-1]=2\cos(\xi)$, $c_p[-2]=-1$ and it is unique as long the frequency $\xi=\pi(p+\frac{1}{2}+f)$ is not chosen such that $\hat{v}(f)=0$. One finds that the mean value of the squared prediction error according to equation (6) vanishes. Consequently, the sinusoidal prediction is perfect, up to the approximation of equation (25). The invariance property to frequency shifts is illustrated here by the fact that using the definition $\xi=\pi(p+\frac{1}{2}+f)$, the prediction coefficient $c_p[-1]$ can be rewritten in terms of the normalized frequency f, as $c_p[-1]=-2(-1)^p\sin(\pi f)$. This means that the prediction coefficients are only dependent on the normalized frequency f within a particular subband. The absolute values of the prediction coefficients are, however, independent of the subband index p.

As discussed above for FIG. 4, in-band prediction has certain shortcomings with respect to alias artifacts in noise shaping. The next example relates to the improved behavior as illustrated by FIG. 5. A causal cross-band prediction as taught in the present document is obtained by selecting the prediction mask support B={(p−1,−1), (p,−1),(p+1,−1)}, which requires only one earlier time slot instead of two, and which performs a noise shaping with less alias frequency contributions than the classical prediction mask 202 of the first example. The prediction mask support B={(p−1,−1), (p,−1),(p+1,−1)} corresponds to the prediction mask 203 of FIG. 2. The normal equations (26) based on the approximation of equation (25) reduce in this case to two equations for the three unknown coefficients $c_m[-1]$, m=p−1, p, p+1, $$\begin{cases} \hat{v}(\pi f)c_p[-1] = (-1)^{p+1}\hat{v}(\pi f)\sin(\pi f) \\ \hat{v}(\pi(f+1))c_{p-1}[-1] - \hat{v}(\pi(f-1))c_{p+1}[-1] = (-1)^p\hat{v}(\pi f)\cos(\pi f) \end{cases}. \quad (28)$$

One finds that any solution to equations (28) leads to a vanishing mean value of the squared prediction error according to equation (6). A possible strategy to select one solution among the infinite number of solutions to equations (28) is to minimize the sum of squares of the prediction coefficients. This leads to the coefficients given by $$\begin{cases} c_{p-1}[-1] = \frac{(-1)^p\hat{v}(\pi f)\hat{v}(\pi(f+1))\cos(\pi f)}{\hat{v}(\pi(f-1))^2 + \hat{v}(\pi(f+1))^2} \\ c_p[-1] = (-1)^{p+1}\sin(\pi f) \\ c_{p+1}[-1] = \frac{(-1)^{p+1}\hat{v}(\pi f)\hat{v}(\pi(f-1))\cos(\pi f)}{\hat{v}(\pi(f-1))^2 + \hat{v}(\pi(f+1))^2} \end{cases}. \quad (29)$$

It is clear from the formulas (29) that the prediction coefficients only depend on the normalized frequency f with respect to the midpoint of the target subband p, and further depend on the parity of the target subband p.

By using the same prediction mask support B={(p−1,−1),(p,−1),(p+1,−1)} to predict the three subband samples ⟨x, $w_{m,0}$⟩ for m=p−1, p, p+1, as illustrated by the prediction mask 204 of FIG. 2, a 3×3 prediction matrix is obtained. Upon introduction of a more natural strategy for avoiding the ambiguity in the normal equations, namely by inserting the relaxed sinusoidal model $r(\tau)=\exp(-\in|\tau|)\cos(\xi\tau)$ corresponding to $P(\omega)=\in((\in^2+(\omega-\xi)^2)^{-1}+(\in^2+(\omega+\xi)^2)^{-1})$, numerical computations lead to the 3×3 prediction matrix elements of FIG. 3. The prediction matrix elements are shown as function of the normalized frequency f∈[−½,½] in the case of an overlap K=2 with a sinusoidal window function v(t)=cos(πt/2) and in case of an odd subband p. As such, it has been shown that signal models x(t) may be used to describe underlying characteristics of the to-be-encoded input audio signal. Parameters which describe the autocorrelation function r(τ) may be transmitted to a decoder 100, thereby enabling the decoder 100 to calculate the predictor from the transmitted parameters and from the knowledge of the signal model x(t). It has been shown that for modulated filterbanks, efficient means for determining the subband covariance matrix of the signal model and for solving the normal equations to determine the predictor coefficients can be derived. In particular, it has been shown that the resulting predictor coefficients are invariant to subband shifts and are typically only dependent on a normalized frequency relative to a particular subband. As a result, pre-determined look-up tables (as illustrated e.g. in FIG. 3) can be provided which allow for the determination of predictor coefficients knowing a normalized frequency f which is independent (apart from a parity value) of the subband index p for which the predictor coefficients are determined In the following, periodic model based prediction, e.g. using a single fundamental frequency Ω, is described in further details. The autocorrelation function r(τ) of such a periodic model is given by equation (13). The equivalent PSD or line spectrum is given by $$P(\omega) = \Omega \sum_{q \in Z} \delta(\omega - q\Omega). \quad (30)$$

When the period T of the periodic model is sufficiently small, e.g. T≤1, the fundamental frequency Q=2π/T is sufficiently large to allow for the application of a sinusoidal model as derived above using the partial frequency $\xi=q\Omega$ closest to the center frequency π(p+½) of the subband p of the target subband sample which is to be predicted. This means that periodic signals having a small period T, i.e. a period which is small with respect to the time stride of the filterbank, can be well modeled and predicted using the sinusoidal model described above.

When the period T is sufficiently large compared to the duration K of the filterbank window v(t), the predictor reduces to an approximation of a delay by T. As will be shown, the coefficients of this predictor can be read directly from the waveform cross correlation function given by equation (19).

Insertion of the model according to equation (13) into equation (22) leads to $$R_{n,m}[\lambda] = \sum_{q \in Z} U_{n,m}(qT - \lambda), \qquad (31)$$

An important observation is that if $T \geq 2K$, then at most one term of equation (31) is nonzero for each $\lambda$ since $U_{n,m}(\tau)=0$ for $|\tau|>K$. By choosing a prediction mask support $B=I \times J$ with time slot diameter $D=|J| \leq T-K$ one observes that $(n,k)$, $(m,l) \in B$ implies $|k-l| \leq T-K$, and therefore the single term of equation (31) is that for $q=0$. It follows that $R_{n,m}[k-l]=U_{n,m}(k-l)$, which is the inner product of orthogonal waveforms and which vanishes unless both $n=m$ and $k=l$. All in all, the normal equations (7) become $$c_n[k]=R_{n,p}[k], (n,k) \in B. \qquad (32)$$

The prediction mask support may be chosen to be centered around $k=k_0 \approx -T$, in which case the right hand side of equation (32) has its single contribution from $q=-1$. Then the coefficients are given by $$c_n[k]=U_{n,p}[-k-T], (n,k) \in B, \qquad (33)$$

wherein the explicit expression from equation (19) can be inserted. The geometry of the prediction mask support for this case could have the appearance of the prediction mask support of the prediction mask 205 of FIG. 2. The mean value of the squared prediction error given by equation (6) is equal to the squared norm of the projection of $u_p(t+T)$ onto the space spanned by the complement of the approximating waveforms $w_{m,l}(t), (m,l) \notin B$.

In view of the above, it is taught by the present document that the subband sample $\langle x, w_{p,0} \rangle$ (from subband p and at time index 0) can be predicted by using a suitable prediction mask support B centered around $(p, -T)$ with time diameter approximately equal to T. The normal equations may be solved for each value of T and p. In other words, for each periodicity T of an input audio signal and for each subband p, the prediction coefficients for a given prediction mask support B may be determined using the normal equations (33).

With a large number of subbands p and a wide range of periods T, a direct tabulation of all predictor coefficients is not practical. But in a similar manner to the sinusoidal model, the modulation structure of the filterbank offers a significant reduction of the necessary table size, through the invariance property with respect to frequency shifts. It will typically be sufficient to study the shifted harmonic model with shift parameter $-\frac{1}{2} < \theta \leq \frac{1}{2}$ centered around the center of a subband p, i.e. centered around $\pi(p+\frac{1}{2})$, defined by the subset $S(\theta)$ of positive frequencies among the collection of frequencies $\pi(p+\frac{1}{2})+(q+\theta)\Omega, q \in Z$, $$P(\omega) = \Omega \sum_{\xi \in S(\theta)} (\delta(\omega - \xi) + \delta(\omega + \xi)). \qquad (34)$$

suitable choice of the shift parameter $\theta$. Insertion of equation (34) into equation (24) with $n=p+\nu$ and $m=p+\mu$ (wherein $\nu$ and $\mu$ define the subband indexes around subband p of the prediction mask support) and manipulations based on Fourier analysis leads to the following expression for the covariance matrix, $$R_{p+\nu,p+\mu}[\lambda] \approx \qquad (35)$$

$$\frac{(-1)^{p\lambda}}{2} \sum_{l \in Z} \kappa_{\nu-\mu}(Tl - \lambda) \cos\left(2\pi l \theta + \frac{\pi}{2}((\nu + \mu)(\lambda - Tl) + \lambda - \nu + \mu)\right).$$

As can be seen, expression (35) depends on the target subband index p only through the factor $(-1)^{p\lambda}$. For the case of a large period T and a small temporal lag $\lambda$, only the term for $l=0$ contributes to expression (35), and one finds again that the covariance matrix is the identity matrix. The right hand side of the normal equations (26) for a suitable prediction mask support B centered around $(p, -T)$ then gives the prediction coefficients directly as $$c_{p+\nu}[k] = \frac{(-1)^{pk}}{2} \kappa_\nu(-T - k) \cos\left(-2\pi\theta + \frac{\pi}{2}(\nu(k + T) + k - \nu)\right), \qquad (36)$$

$$(p + \nu, k) \in B.$$

This recovers the contribution of the first term of equations (19) to (33) with the canonical choice of shift $\theta = -\pi(p+\frac{1}{2})/\Omega$.

Equation (36) allows determining the prediction coefficients $c_{p+\nu}[k]$ for a subband $(p+\nu)$ at a time index k, wherein the to-be-predicted sample is a sample from subband p at time index 0. As can be seen from equation (36), the prediction coefficients $c_{p+\nu}[k]$ depend on the target subband index p only through the factor $(-1)^{pk}$ which impacts the sign of the prediction coefficient. The absolute value of the prediction coefficient is, however, independent of the target subband index p. On the other hand, the prediction coefficient $c_{p+\nu}[k]$ is dependent on the periodicity T and the shift parameter $\theta$. Furthermore, the prediction coefficient $c_{p+\nu}[k]$ is dependent on $\nu$ and k, i.e. on the prediction mask support B, used for predicting the target sample in the target subband p.

In the present document, it is proposed to provide a look-up table which allows to look-up a set of prediction coefficients $c_{p+\nu}[k]$ for a pre-determined prediction mask support B. For a given prediction mask support B, the look-up table provides a set of prediction coefficients $c_{p+\nu}[k]$ for a pre-determined set of values of the periodicity T and values of the shift parameter $\theta$. In order to limit the number of look-up table entries, the number of pre-determined values of the periodicity T and the number of pre-determined values of the shift parameter $\theta$ should be limited. As can be seen from expression (36), a suitable quantization step size for the pre-determined values of periodicity T and shift parameter $\theta$ should be dependent on the periodicity T. In particular, it can be seen that for relatively large periodicities T (relative to the duration K of the window function), relatively large quantization steps for the periodicity T and for the shift parameter $\theta$ may be used. On the other extreme, for relatively small periodicities T tending towards zero, only one sinusoidal contribution has to be taken into account, so the periodicity T loses its importance. On the other hand, the formulas for sinusoidal prediction according to equation (29) require the normalized absolute frequency shift $f=\Omega\theta/\pi=\frac{1}{2}\theta/T$ to be slowly varying, so the quantization step size for the shift parameter $\theta$ should be scaled based on the periodicity T.

All in all, it is proposed in the present document to use a uniform quantization of the periodicity T with a fixed step size. The shift parameter $\theta$ may also be quantized in a uniform manner, however, with a step size which is proportional to $\min(T, A)$, where the value of A depends on the specifics of the filterbank window function. Moreover, for $T<2$, the range of shift parameters $\theta$ may be limited to $|\theta| \leq \min(CT, \frac{1}{2})$ for some constant C, reflecting a limit on the absolute frequency shifts f.

Figure 6A:
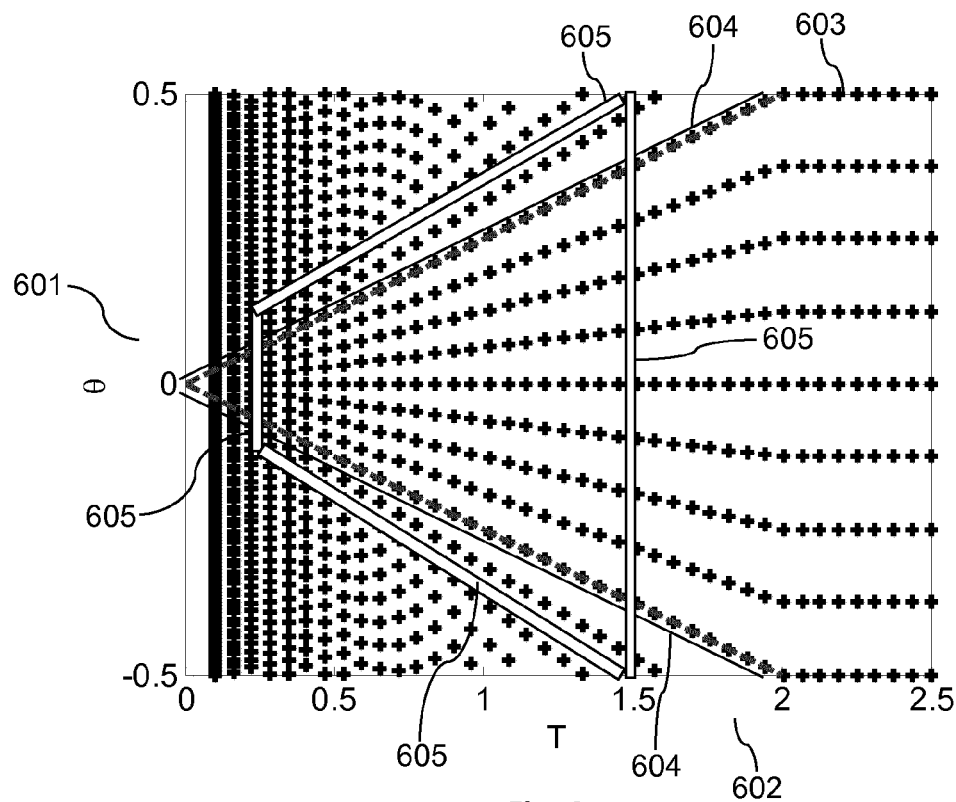
FIG. 6a depicts an example two-dimensional quantization grid underlying the tabulated data for a periodic model based predictor calculation.

FIG. 6a illustrates an example of a resulting quantization grid in the $(T, \theta)$-plane for $A=2$. Only in the intermediate range ranging from $0.25 \leq T \leq 1.5$ the full two-dimensional dependence is considered, whereas the essentially one-dimensional parameterizations as given by equations (29) and equations (36) can be used for the remaining range of interest. In particular, for periodicities T which tend towards zero (e.g. $T<0.25$) periodic model based prediction substantially corresponds to sinusoidal model based prediction, and the prediction coefficients may be determined using formulas (29). On the other hand, for periodicities T which substantially exceed the window duration K (e.g. $T>1.5$) the set of prediction coefficients $c_{p+v}[k]$ using periodic model based prediction may be determined using equation (36). This equation can be re-interpreted by means of the substitution $\theta=\phi+\frac{1}{4}Tv$. One finds that $$c_{p+v}[k]=(-1)^{pk}/2\kappa_v(-T-k)\cos(-2\pi\phi+\pi/2(v+1)k-v)), \quad (p+v,k)\in B. \qquad (37)$$

By giving $\phi$ the role given to the parameter $\theta$ in the tabulation, an essentially separable structure is obtained in the equivalent $(T, \phi)$-plane. Up to sign changes depending on subband and time slot indices, the dependence on T is contained in a first slowly varying factor, and the dependence on $\phi$ is contained in 1-periodic second factor in equation (37).

One can interpret the modified offset parameter $\phi$ as the shift of the harmonic series in units of the fundamental frequency as measured from the midpoint of the midpoints of the source and target bins. It is advantageous to maintain this modified parameterization $(T, \phi)$ for all values of periodicities T since symmetries in equation (37) that are apparent with respect to simultaneous sign changes of $\phi$ and $v$ will hold in general and may be exploited in order to reduce table sizes.

As indicated above FIG. 6a depicts a two-dimensional quantization grid underlying the tabulated data for a periodic model based predictor calculation in a cosine modulated filterbank. The signal model is that of a signal with period T 602, measured in units of the filterbank time step. Equivalently, the model comprises the frequency lines of the integer multiples, also known as partials, of the fundamental frequency corresponding to the period T. For each target subband, the shift parameter $\theta$ 601 indicates the distance of the closest partial to the center frequency measured in units of the fundamental frequency $\Omega$. The shift parameter $\theta$ 601 has a value between −0.5 and 0.5. The black crosses 603 of FIG. 6a illustrate an appropriate density of quantization points for the tabulation of predictors with a high prediction gain based on the periodic model. For large periods T (e.g. $T>2$), the grid is uniform. An increased density in the shift parameter $\theta$ is typically required as the period T decreases. However, in the region outside of the lines 604, the distance $\theta$ is greater than one frequency bin of the filterbank, so most grid points in this region can be neglected. The polygon 605 delimits a region which suffices for a full tabulation. In addition to the sloped lines slightly outside of the lines 604, borders at $T=0.25$ and $T=1.5$ are introduced. This is enabled by the fact that small periods 602 can be treated as separate sinusoids, and that predictors for large periods 602 can be approximated by essentially one-dimensional tables depending mainly on the shift parameter $\theta$, (or on the modified shift parameter $\phi$). For the embodiment illustrated in FIG. 6a, the prediction mask support is typically similar to the prediction mask 205 of FIG. 2 for large periods T.

Figure 6B:
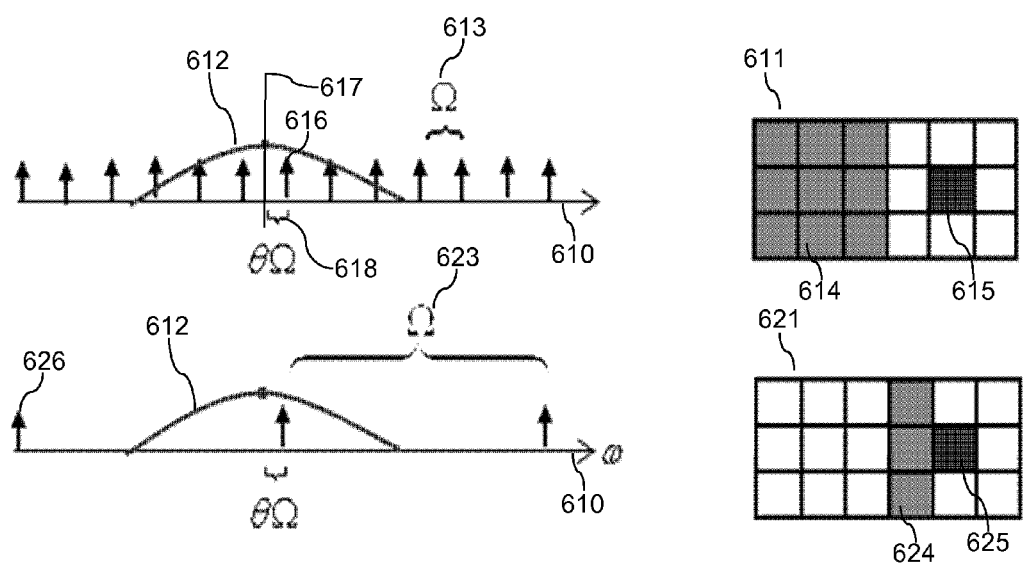
FIG. 6b illustrates the use of different prediction masks for different ranges of signal periodicities.

FIG. 6b illustrates periodic model based prediction in the case of relatively large periods T and in the case of relative small periods T. It can be seen from the upper diagram that for large periods T, i.e. for relatively small fundamental frequencies $\Omega$ 613, the window function 612 of the filterbank captures a relatively large number of lines or Dirac pulses 616 of the PSD of the periodic signal. The Dirac pulses 616 are located at frequencies 610 $\omega=q\Omega$, with $q\in\mathbb{Z}$. The center frequencies of the subbands of the filterbank are located at the frequencies $\omega=\pi(p+\frac{1}{2})$, with $p\in\mathbb{Z}$. For a given subband p, the frequency location of the pulse 616 with frequency $\omega=q\Omega$ closest to the center frequency of the given subband $\omega=\pi(p+\frac{1}{2})$ may be described in relative terms as $q\Omega=\pi(p+\frac{1}{2})+\Theta\Omega$, with the shift parameter $\Theta$ ranging from −0.5 to +0.5. As such, the term $\Theta\Omega$ reflects the distance (in frequency) from the center frequency $\omega=\pi(p+\frac{1}{2})$ to the nearest frequency component 616 of the harmonic model. This is illustrated in the upper diagram of FIG. 6b where the center frequency 617 is $\omega=\pi(p+\frac{1}{2})$ and where the distance 618 $\Theta\Omega$ is illustrated for the case of a relatively large period T. It can be seen that the shift parameter $\Theta$ allows describing the entire harmonic series viewed from the perspective of the center of the subband p.

The lower diagram of FIG. 6b illustrates the case for relatively small periods T, i.e. for relatively large fundamental frequencies $\Omega$ 623, notably fundamental frequencies 623 which are greater than the width of the window 612. It can be seen that in such cases, a window function 612 may only comprise a single pulse 626 of the periodic signal, such that the signal may be viewed as a sinusoidal signal within the window 612. This means that for relatively small periods T, the periodic model based prediction scheme converges towards a sinusoidal modal based prediction scheme.

FIG. 6b also illustrates example prediction masks 611, 621 which may be used for the periodic model based prediction scheme and for the sinusoidal model based prediction scheme, respectively. The prediction mask 611 used for the periodic model based prediction scheme may correspond to the prediction mask 205 of FIG. 2 and may comprise the prediction mask support 614 for estimating the target subband sample 615. The prediction mask 621 used for the sinusoidal model based prediction scheme may correspond to the prediction mask 203 of FIG. 2 and may comprise the prediction mask support 624 for estimating the target subband sample 625.

Figure 7A:
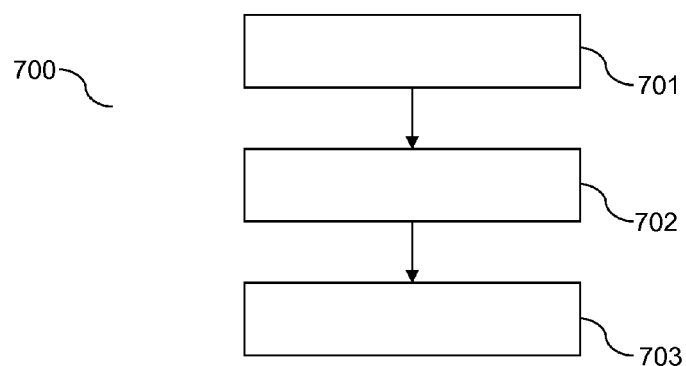
FIGS. 7a and 7b show flow charts of example encoding and decoding methods using model based subband prediction.

FIG. 7a illustrates an example encoding method 700 which involves model based subband prediction using a periodic model (comprising e.g. a single fundamental frequency $\Omega$). A frame of an input audio signal is considered. For this frame a periodicity T or a fundamental frequency $\Omega$ may be determined (step 701). The audio encoder may comprise the elements of the decoder 100 illustrated in FIG. 1, in particular, the audio encoder may comprise a predictor calculator 105 and a subband predictor 103. The periodicity T or the fundamental frequency $\Omega$ may be determined such that the mean value of the squared prediction error subband signals 111 according to equation (6) is reduced (e.g. minimized). By way of example, the audio encoder may apply a brute force approach which determines the prediction error subband signals 111 using different fundamental frequencies $\Omega$ and which determines the fundamental frequency $\Omega$ for which the mean value of the squared prediction error subband signals 111 is reduced (e.g. minimized). The method proceeds in quantizing the resulting prediction error subband signals 111 (step 702). Furthermore, the method comprises the step of generating 703 a bitstream comprising information indicative of the determined fundamental frequency $\Omega$ and of the quantized prediction error subband signals 111.

When determining the fundamental frequency $\Omega$ in step 701, the audio encoder may make use of the equations (36) and/or (29), in order to determine the prediction coefficients for a particular fundamental frequency $\Omega$. The set of possible fundamental frequencies $\Omega$ may be limited by the number of bits which are available for the transmission of the information indicative of the determined fundamental frequency $\Omega$.

It should be noted that the audio coding system may use a pre-determined model (e.g. a periodic model comprising a single fundamental frequency $\Omega$ or any other of the models provided in the present document) and/or a pre-determined prediction mask 202, 203, 204, 205. On the other hand, the audio coding system may be provided with further degrees of freedom by enabling the audio encoder to determine an appropriate model and/or an appropriate prediction mask for a to-be-encoded audio signal. The information regarding the selected model and/or the selected prediction mask is then encoded into the bit stream and provided to the corresponding decoder 100.

Figure 7B:
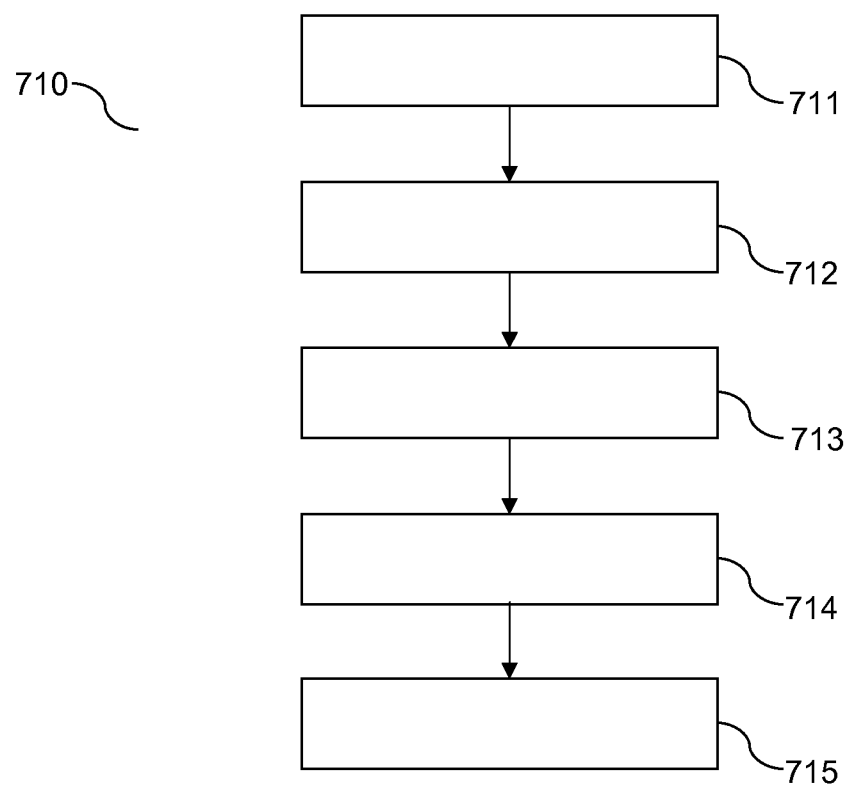

FIG. 7b illustrates an example method 710 for decoding an audio signal which has been encoded using model based prediction. It is assumed that the decoder 100 is aware of the signal model and the prediction mask used by the encoder (either via the received bit stream or due to pre-determined settings). Furthermore, it is assumed for illustrative purposes that a periodic prediction model has been used. The decoder 100 extracts information regarding the fundamental frequency $\Omega$ from the received bit stream (step 711). Using the information regarding the fundamental frequency $\Omega$, the decoder 100 may determine the periodicity T. The fundamental frequency $\Omega$ and/or the periodicity T may be used to determine a set of prediction coefficients for the different subband predictors (step 712). The subband predictors may be used to determine estimated subband signals (step 713) which are combined (step 714) with the dequantized prediction error subband signals 111 to yield the decoded subband signals 113. The decoded subband signals 113 may be filtered (step 715) using a synthesis filterbank 102, thereby yielding the decoded time domain audio signal 114.

The predictor calculator 105 may make use of the equations (36) and/or (29) for determining the prediction coefficients of the subband predictors 103 based on the received information regarding the fundamental frequency $\Omega$ (step 712). This may be performed in an efficient manner using a look-up table as illustrated in FIGS. 6a and 3. By way of example, the predictor calculator 105 may determine the periodicity T and determine whether the periodicity lies below a pre-determined lower threshold (e.g. T=0.25). If this is the case, a sinusoidal model based prediction scheme is used. This means that based on the received fundamental frequency $\Omega$, the subbands p is determined which comprises a multiple $\omega=q\Omega$, with $q \in \mathbb{Z}$, of the fundamental frequency. Then the normalized frequency f is determined using the relation $\xi=\pi(p+\frac{1}{2}+f)$, where the frequency $\xi$ corresponds to the multiple $\omega=q\Omega$ which lies in subband p. The predictor calculator 105 may then use equation (29) or a pre-calculated look-up table to determine the set of prediction coefficients (using e.g. the prediction mask 203 of FIG. 2 or the prediction mask 621 of FIG. 6b).

It should be noted that a different set of prediction coefficients may be determined for each subband. However, in case of a sinusoidal model based prediction scheme, a set of prediction coefficients is typically only determined for the subbands p which are significantly affected by a multiple $\omega=q\Omega$, with $q \in \mathbb{Z}$, of the fundamental frequency. For the other subbands, no prediction coefficients are determined which means that the estimated subband signals 112 for such other subbands are zero. In order to reduce the computation complexity of the decoder 100 (and of the encoder using the same predictor calculator 105), the predictor calculator 105 may make use of a pre-determined look-up table which provides the set of prediction coefficients, subject to values for T and $\Theta$. In particular, the predictor calculator 105 may make use of a plurality of look-up tables for a plurality of different values for T. Each of the plurality of look-up tables provides a different set of prediction coefficients for a plurality of different values of the shift parameter $\Theta$.

In a practical implementation, a plurality of look-up tables may be provided for different values of the period parameter T. By way of example, look-up tables may be provided for values of T in the range of 0.25 and 2.5 (as illustrated in FIG. 6a). The look-up tables may be provided for a pre-determined granularity or step size of different period parameters T. In an example implementation, the step size for the normalized period parameter T is 1/16, and different look-up tables for the quantized prediction coefficients are provided for T=8/32 up to T=80/32. Hence, a total of 37 different look-up tables may be provided. Each table may provide the quantized prediction coefficients as a function of the shift parameter $\Theta$ or as a function of the modified shift parameter $\phi$. The look-up tables for T=8/32 up to T=80/32 may be used for a range which is augmented by half a step size, i.e. [9/32, 81/32]. For a given periodicity which differs from the available periodicities, for which a look-up tables has been defined, the look-up table for the nearest available periodicity may be used. As outlined above, for long periods T (e.g. for periods T which exceed the period for which a look-up table is defined), equation (36) may be used. Alternatively, for periods T which exceed the periods for which look-up tables have been defined, e.g. for periods T>81/32, the period T may be separated into an integer delay $T_i$ and a residual delay $T_r$, such that $T=T_i+T_r$. The separation may be such that the residual delay $T_r$ lies within the interval for which equation (36) is applicable and for which look-up tables are available, e.g. within the interval [1.5, 2.5] or [49/32, 81/32] for the example above. By doing this, the prediction coefficients can be determined using the loop-up table for the residual delay $T_r$ and the subband predictor 103 may operate on a subband buffer 104 which has been delayed by the integer delay $T_i$. For example, if the period is T=3.7, the integer delay may be $T_i=2$, followed by a residual delay of $T_r=1.7$. The predictor may be applied based on the coefficients for $T_r=1.7$ on a signal buffer which is delayed by (an additional) $T_i=2$.

The separation approach relies on the reasonable assumption that the extractor approximates a delay by T in the range of [1.5, 2.5] or [49/32, 81/32]. The advantage of the separation procedure compared to the usage of equation (36) is that the prediction coefficients can be determined based on computationally efficient table look-up operations.

As outlined above, for short periods (T<0.25) equation (29) may be used to determine the prediction coefficients.

Alternatively, it may be beneficial to make use of the (already available) look-up tables (in order to reduce the computational complexity). It is observed that the modified shift parameter $\phi$ is limited to the range $|\phi| \leq T$ with a sampling step size of $\Delta\phi = T/32$ (for T<0.25, and for C=1, A=½).

It is proposed in the present document to reuse the look-up table for the lowest period T=0.25, by means of a scaling of the modified shift parameter $\phi$ with $T_l/T$, wherein $T_l$ corresponds to the lowest period for which a look-up table is available (e.g. $T_l$=0.25). By way of example, with T=0.1 and $\phi$=0.07, the table for T=0.25 may be queried with a resealed shift parameter $\phi = (0.25/0.1) \cdot 0.07 = 0.175$. By doing this, the prediction coefficients for short periods (e.g. T<0.25) can also be determined in a computationally efficient manner using table look-up operations. Furthermore, the memory requirements for the predictor can be reduced, as the number of look-up tables can be reduced.

In the present document, a model based subband prediction scheme has been described. The model based subband prediction scheme enables an efficient description of subband predictors, i.e. a description requiring only a relatively low number of bits. As a result of an efficient description for subband predictors, cross-subband prediction schemes may be used which lead to reduced aliasing artifacts. Overall, this allows the provision of low bit rate audio coders using subband prediction.

The invention claimed is:

1. A method, performed by an audio signal processing device, for estimating a first sample of a first subband signal in a first subband of an audio signal; wherein the first subband signal of the audio signal is determined using an analysis filterbank comprising a plurality of analysis filters which provide a plurality of subband signals in a plurality of subbands from the audio signal, respectively, the method comprising
  determining a model parameter of a signal model;
  determining a prediction coefficient to be applied to a previous sample of a first decoded subband signal derived from the first subband signal, based on the signal model, based on the model parameter and based on the analysis filterbank; wherein
  a time slot of the previous sample is prior to a time slot of the first sample; and
  determining an estimate of the first sample by applying the prediction coefficient to the previous sample;
  wherein
  determining the prediction coefficient comprises determining the prediction coefficient using a look-up table or an analytical function;
  the look-up table or the analytical function provide the prediction coefficient as a function of a parameter derived from the model parameter;
  the look-up table or the analytical function are pre-determined based on the signal model and based on the analysis filterbank; and
  the audio signal processing device comprises one of more processors.

2. The method of claim 1, wherein
  the signal model comprises one or more sinusoidal model components;
  the model parameter is indicative of a frequency of the one or more sinusoidal model components, and optionally wherein
  the model parameter is indicative of a fundamental frequency $\Omega$ of a multi-sinusoidal signal model;

the multi-sinusoidal signal model comprises a periodic signal component;
  the periodic signal component comprises a plurality of sinusoidal components; and
  the plurality of sinusoidal components have a frequency which is a multiple of the fundamental frequency $\Omega$.

3. The method of claim 1, wherein determining the model parameter comprises extracting the model parameter from a received bitstream indicative of the model parameter and a prediction error signal.

4. The method of claim 1, wherein
  determining the model parameter comprises determining the model parameter such that a mean value of a squared prediction error signal is reduced;
  the prediction error signal is determined based on the difference between the first sample and the estimate of the first sample; and optionally wherein the mean value of the squared prediction error signal is determined based on a plurality of succeeding first samples of the first subband signal.

5. The method of claim 1, wherein
  the model parameter is indicative of a fundamental frequency $\Omega$ of a multi-sinusoidal signal model; and
  determining the prediction coefficient comprises determining a multiple of the fundamental frequency $\Omega$ which lies within the first subband.

6. The method of claim 5, wherein determining the prediction coefficient comprises
  selecting one of a plurality of look-up tables based on the model parameter; and
  determining the prediction coefficient based on the selected one of the plurality of look-up tables.

7. The method of claim 6, wherein
  the model parameter is indicative of a periodicity T;
  the plurality of look-up tables comprises look-up tables for different values of periodicity T;
  the method comprises determining the selected look-up table as the look-up table for the periodicity T indicated by the model parameter; and optionally wherein the plurality of look-up tables comprises look-up tables for different values of periodicity T within the range of $[T_{min}, T_{max}]$ at a pre-determined step size $\Delta T$;
  $T_{min}$ is such that for $T < T_{min}$, the audio signal can be modeled using a signal model comprising a single sinusoidal model component; and/or
  $T_{max}$ is such that for $T > T_{max}$, the look-up tables for the periodicities
  $T_{max}$ to $T_{max}+1$ correspond to the look-up tables for the periodicities $T_{max}-1$ to $T_{max}$.

8. The method of claim 1, wherein
  the plurality of subbands have an equal subband spacing; and
  the first subband is one of the plurality of subbands; and/or
  the analysis filters of the analysis filterbank are shift-invariant with respect to one another; and/or
  the analysis filters of the analysis filterbank comprise a common window function; and/or
  the analysis filters of the analysis filterbank comprise differently modulated versions of the common window function; and/or
  the common window function is modulated using a cosine function; and/or
  the common window function has a finite duration K; and/or
  the analysis filters of the analysis filterbank form an orthogonal basis; and/or the analysis filters of the analysis filterbank form an orthonormal basis; and/or the analysis filterbank comprises a cosine modulated filterbank; and/or the analysis filterbank is a critically sampled filterbank; and/or the analysis filterbank comprises an overlapped transform; and/or the analysis filterbank comprises one or more of: an MDCT, a QMF, an ELT transform; and/or the analysis filterbank comprises a modulation structure.

9. A method, performed by an audio signal processing device, for estimating a first sample of a first subband signal in a first subband of an audio signal; wherein the first subband signal of the audio signal is determined using an analysis filterbank comprising a plurality of analysis filters which provide a plurality of subband signals in a plurality of subbands from the audio signal, respectively; wherein the analysis filterbank is a critically sampled filterbank; the method comprising determining a prediction mask indicative of a plurality of previous samples in a plurality of prediction mask support subbands; wherein the plurality of prediction mask support subbands comprise at least one of the plurality of subbands different from the first subband;

determining a plurality of prediction coefficients to be applied to the plurality of previous samples; and determining an estimate of the first sample by applying the plurality of prediction coefficients to the plurality of previous samples, respectively;

wherein the audio signal processing device comprises one of more processors.

10. The method of claim 9, wherein the plurality of prediction mask support subbands comprise the first subband; and/or comprise one or more of the plurality of subbands directly adjacent to the first subband.

11. A method, performed by an audio signal processing device, for encoding an audio signal, the method comprising determining a plurality of subband signals from the audio signal using an analysis filterbank comprising a plurality of analysis filters;

estimating samples of the plurality of subband signals using the method of claim 1, thereby yielding a plurality of estimated subband signals;

determining samples of a plurality of prediction error subband signals based on corresponding samples of the plurality of subband signals and the samples of the plurality of estimated subband signals;

quantizing the plurality of prediction error subband signals; and generating an encoded audio signal indicative of the plurality of quantized prediction error subband signals and of one or more parameters used for estimating the samples of the plurality of estimated subband signals;

wherein the audio signal processing device comprises one of more processors.

12. A method, performed by an audio signal processing device, for encoding an audio signal, the method comprising determining a plurality of subband signals from the audio signal using an analysis filterbank comprising a plurality of analysis filters;

estimating samples of the plurality of subband signals using the method of claim 9, thereby yielding a plurality of estimated subband signals;

determining samples of a plurality of prediction error subband signals based on corresponding samples of the plurality of subband signals and the samples of the plurality of estimated subband signals;

quantizing the plurality of prediction error subband signals; and generating an encoded audio signal indicative of the plurality of quantized prediction error subband signals and of one or more parameters used for estimating the samples of the plurality of estimated subband signals;

wherein the audio signal processing device comprises one of more processors.

13. A method, performed by an audio signal processing device, for decoding an encoded audio signal; wherein the encoded audio signal is indicative of a plurality of quantized prediction error subband signals and of one or more parameters to be used for estimating samples of a plurality of estimated subband signals; the method comprising de-quantizing the plurality of quantized prediction error subband signals, thereby yielding a plurality of de-quantized prediction error subband signals;

estimating samples of the plurality of estimated subband signals using the method of claim 1;

determining samples of a plurality of decoded subband signals based on corresponding samples of the plurality of estimated subband signals and samples of the plurality of de-quantized prediction error subband signals; and determining a decoded audio signal from the plurality of decoded subband signals using a synthesis filterbank comprising a plurality of synthesis filters;

wherein the audio signal processing device comprises one of more processors.

14. A method, performed by an audio signal processing device, for decoding an encoded audio signal; wherein the encoded audio signal is indicative of a plurality of quantized prediction error subband signals and of one or more parameters to be used for estimating samples of a plurality of estimated subband signals; the method comprising de-quantizing the plurality of quantized prediction error subband signals, thereby yielding a plurality of de-quantized prediction error subband signals;

estimating samples of the plurality of estimated subband signals using the method of claim 9;

determining samples of a plurality of decoded subband signals based on corresponding samples of the plurality of estimated subband signals and samples of the plurality of de-quantized prediction error subband signals; and determining a decoded audio signal from the plurality of decoded subband signals using a synthesis filterbank comprising a plurality of synthesis filters;

wherein the audio signal processing device comprises one of more processors.

15. A system, comprising an audio signal processing device, configured to estimate one or more first samples of a first subband signal of an audio signal; wherein the first subband signal of the audio signal is determined using an analysis filterbank comprising a plurality of analysis filters which provide a plurality of subband signals from the audio signal, respectively; wherein the system comprises a predictor calculator configured to determine a model parameter of a signal model;

and configured to determine one or more prediction coefficients to be applied to one or more previous samples of a first decoded subband signal derived from the first subband signal; wherein the one or more prediction coefficients are determined based on the signal model, based on the model parameter and based on the analysis filterbank; wherein time slots of the one or more previous samples are prior to time slots of the one or more first samples; and a subband predictor configured to determine an estimate of the one or more first samples by applying the one or more prediction coefficients to the one or more previous samples;

wherein determining the prediction coefficient comprises determining the prediction coefficient using a look-up table or an analytical function;

the look-up table or the analytical function provide the prediction coefficient as a function of a parameter derived from the model parameter;

the look-up table or the analytical function are pre-determined based on the signal model and based on the analysis filterbank; and the audio signal processing device comprises one of more processors.

16. A system, comprising an audio signal processing device, configured to estimate one or more first samples of a first subband signal of an audio signal; wherein the first suband signal corresponds to a first subband; wherein the first subband signal is determined using an analysis filterbank comprising a plurality of analysis filters which provide a plurality of subband signals in a plurality of subbands, respectively; wherein the analysis filterbank is a critically sampled filterbank; wherein the system comprises a predictor calculator configured to determine a prediction mask indicative of a plurality of previous samples in a plurality of prediction mask support subbands;

wherein the plurality of prediction mask support subbands comprises at least one of the plurality of subbands different from the first subband; wherein the predictor calculator is further configured to determine a plurality of prediction coefficients to be applied to the plurality of previous samples; and a subband predictor configured to determine an estimate of the one or more first samples by applying the plurality of prediction coefficients to the plurality of previous samples, respectively;

wherein the audio signal processing device comprises one of more processors.

17. An audio signal processing device configured to encode an audio signal, the audio signal processing device comprising an analysis filterbank configured to determine a plurality of subband signals from the audio signal using a plurality of analysis filters;

a system according to claim 15 configured to estimate samples of the plurality of subband signals, thereby yielding a plurality of estimated subband signals;

a difference unit configured to determine samples of a plurality of prediction error subband signals based on corresponding samples of the plurality of subband signals and of the plurality of estimated subband signals;

a quantizing unit configured to quantize the plurality of prediction error subband signals; and a bitstream generation unit configured to generate an encoded audio signal indicative of the plurality of quantized prediction error subband signals and of one or more parameters used for estimating the samples of the plurality of estimated subband signals;

wherein the audio signal processing device comprises one or more processors.

18. An audio signal processing device configured to encode an audio signal, the audio processing comprising an analysis filterbank configured to determine a plurality of subband signals from the audio signal using a plurality of analysis filters;

a system according to claim 16 configured to estimate samples of the plurality of subband signals, thereby yielding a plurality of estimated subband signals;

a difference unit configured to determine samples of a plurality of prediction error subband signals based on corresponding samples of the plurality of subband signals and of the plurality of estimated subband signals;

a quantizing unit configured to quantize the plurality of prediction error subband signals; and a bitstream generation unit configured to generate an encoded audio signal indicative of the plurality of quantized prediction error subband signals and of one or more parameters used for estimating the samples of the plurality of estimated subband signals;

wherein the audio signal processing device comprises one or more processors.

19. An audio signal processing device configured to decode an encoded audio signal; wherein the encoded audio signal is indicative of the plurality of quantized prediction error subband signals and one or more parameters used for estimating samples of a plurality of estimated subband signals; wherein the audio signal process device comprises an inverse quantizer configured to de-quantizing the plurality of quantized prediction error subband signals, thereby yielding a plurality of de-quantized prediction error subband signals;

a system according to claim 15, configured to estimate samples of the plurality of estimated subband signals;

a summing unit configured to determine samples of a plurality of decoded subband signals based on corresponding samples of the plurality of estimated subband signals and based on samples of the plurality of de-quantized prediction error subband signals; and a synthesis filterbank configured to determine a decoded audio signal from the plurality of decoded subband signals using a plurality of synthesis filters, wherein the audio signal processing device comprises one of more processors.

20. An audio signal processing device configured to decode an encoded audio signal; wherein the encoded audio signal is indicative of the plurality of quantized prediction error subband signals and one or more parameters used for estimating samples of a plurality of estimated subband signals; wherein the audio signal processing device comprises an inverse quantizer configured to de-quantizing the plurality of quantized prediction error subband signals, thereby yielding a plurality of de-quantized prediction error subband signals;

a system according to claim 16, configured to estimate samples of the plurality of estimated subband signals;

a summing unit configured to determine samples of a plurality of decoded subband signals based on corresponding samples of the plurality of estimated subband signals and based on samples of the plurality of de-quantized prediction error subband signals; and a synthesis filterbank configured to determine a decoded audio signal from the plurality of decoded subband signals using a plurality of synthesis filters;

wherein the audio signal processing device comprises one of more processors.

* * * * *

UNITED STATES PATENT AND TRADEMARK OFFICE
CERTIFICATE OF CORRECTION

PATENT NO. : 9,659,567 B2  
APPLICATION NO. : 14/655037  
DATED : May 2, 2017  
INVENTOR(S) : Lars Villemoes Page 1 of 1

It is certified that error appears in the above-identified patent and that said Letters Patent is hereby corrected as shown below:

In the Claims

In Claim 1, Column 29, Line 58, "one of more processors" should read "one or more processors"

In Claim 9, Column 31, Line 31, "one of more processors" should read "one or more processors"

In Claim 11, Column 31, Line 57, "one of more processors" should read "one or more processors"

In Claim 12, Column 32, Line 10, "one of more processors" should read "one or more processors"

In Claim 13, Column 32, Line 31, "one of more processors" should read "one or more processors"

In Claim 14, Column 32, Line 52, "one of more processors" should read "one or more processors"

In Claim 15, Column 33, Line 19, "one of more processors" should read "one or more processors"

In Claim 16, Column 33, Line 44, "one of more processors" should read "one or more processors"

In Claim 19, Column 34, Line 46, "one of more processors" should read "one or more processors"

In Claim 20, Column 35, Line 2, "one of more processors" should read "one or more processors"

Signed and Sealed this  
Twentieth Day of December, 2022

Katherine Kelly Vidal  
*Director of the United States Patent and Trademark Office*